United States Patent
Bastawala et al.

(10) Patent No.: US 10,642,735 B2
(45) Date of Patent: May 5, 2020

(54) STATEMENT CACHE AUTO-TUNING

(71) Applicants: Mehul Dilip Bastawala, Sunnyvale, CA (US); Srinath Krishnaswamy, Fremont, CA (US); Lakshminarayanan Luxi Chidambaran, San Jose, CA (US); Santanu Datta, Fremont, CA (US)

(72) Inventors: Mehul Dilip Bastawala, Sunnyvale, CA (US); Srinath Krishnaswamy, Fremont, CA (US); Lakshminarayanan Luxi Chidambaran, San Jose, CA (US); Santanu Datta, Fremont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 357 days.

(21) Appl. No.: 13/831,912

(22) Filed: Mar. 15, 2013

(65) Prior Publication Data
US 2014/0281252 A1    Sep. 18, 2014

(51) Int. Cl.
*G06F 12/0802*    (2016.01)

(52) U.S. Cl.
CPC .... *G06F 12/0802* (2013.01); *G06F 2212/601* (2013.01)

(58) Field of Classification Search
CPC .... G06F 12/128; G06F 12/08; G06F 12/0802; G06F 2212/601; G06F 2212/08; G06F 2212/0824; G06F 2212/12; G06F 2212/128

See application file for complete search history.

(56) References Cited

U.S. PATENT DOCUMENTS

| | | | | |
|---|---|---|---|---|
| 5,394,531 | A | * | 2/1995 | Smith ................. G06F 12/0866 711/129 |
| 5,517,643 | A | * | 5/1996 | Davy .................... G06F 9/5016 711/173 |
| 5,668,987 | A | | 9/1997 | Schneider |
| 5,752,255 | A | | 5/1998 | Jarvis |
| 5,822,749 | A | * | 10/1998 | Agarwal ............ G06F 12/0866 |
| 6,493,810 | B1 | | 12/2002 | Pang et al. |

(Continued)

FOREIGN PATENT DOCUMENTS

WO    WO 2011143256    11/2011

OTHER PUBLICATIONS

"pkg_cache_lookups—Package Cache Lookups monitor element" http://publib.boulder.ibm.com/infocenter/db2luw/v9r5/index.jsp?topic=%2Fcom.ibm.db2.luw.admin.mon.doc%2Fdoc%2Fr0001270.html, Copyright IBM Corporation 1993-2013, last dated May 9, 2013.

Monica S. Lam, et al., "The Cache Performance and Optimizations of Blocked Algorithms", Fourth Intern. Conf. on Architectural Support for Programming, Language and Operating Systems, Palo Alto, Apr. 9-11, 1991, 12 pages.

(Continued)

*Primary Examiner* — David Yi
*Assistant Examiner* — Tahilba O Puche
(74) *Attorney, Agent, or Firm* — Vista IP Law Group, LLP

(57)    ABSTRACT

Disclosed are methods and apparatuses that implement automatic resizing of statement caches in response to cache metrics. One embodiment provides an approach for periodically calculating a session eligibility index for each session cache, wherein the session eligibility index indicates the priority level of the session cache for resizing, and selecting and resizing one or more cache sessions based at least in part on the session eligibility index.

33 Claims, 22 Drawing Sheets

(56) References Cited

U.S. PATENT DOCUMENTS

| | | | |
|---|---|---|---|
| 7,069,588 B2* | 6/2006 | Call | H04L 41/0213 |
| | | | 713/189 |
| 7,130,981 B1 | 10/2006 | Nachenberg | |
| 7,181,457 B2 | 2/2007 | Reinauer et al. | |
| 7,487,320 B2 | 2/2009 | Bansal et al. | |
| 7,502,775 B2 | 3/2009 | Carroll et al. | |
| 7,882,285 B2 | 2/2011 | Harding et al. | |
| 8,176,251 B2* | 5/2012 | Bali | G06F 12/0804 |
| | | | 711/118 |
| 8,843,435 B1* | 9/2014 | Trefler | G06F 17/3048 |
| | | | 707/600 |
| 8,937,942 B1* | 1/2015 | Li | H04L 67/1097 |
| | | | 370/386 |
| 2005/0015562 A1* | 1/2005 | Goodsell | 711/170 |
| 2006/0085597 A1* | 4/2006 | McNeill, Jr. | G06F 12/0866 |
| | | | 711/118 |
| 2008/0244181 A1 | 10/2008 | Walz et al. | |
| 2010/0095300 A1* | 4/2010 | West | G06F 9/5016 |
| | | | 718/104 |
| 2012/0151141 A1* | 6/2012 | Bell et al. | 711/118 |
| 2012/0173907 A1 | 7/2012 | Moses et al. | |
| 2014/0281249 A1* | 9/2014 | Waldspurger | G06F 12/0802 |
| | | | 711/129 |

OTHER PUBLICATIONS

"Dynamically changing database cache size" http://publib.boulder.ibm.com/infocenter/soliddb/v6r3/index.jsp?topic=/com.ibm.swg.im.soliddb.admin.doc/doc/dynamically.changing.database.cache.size.html, Copyright Oy International Business Machines Ab 1993, 2011, last dated Sep. 13, 2011.

"WebSphere Application Server V7: Session Management", *WebSphere Application Server V7 Administration and Configuration Guide*, Chapter 12, http://www.redbooks.ibm.com/redpapers/pdfs/redp4580.pdf, copyright IBM Corporation 2009.

"Client cache Size Property" http://msdn.microsoft.com/en-us/library/aa237360(v=sql.80).aspx, dated Feb. 1, 2002.

"Resizing the client cache through a script" http://blogs.technet.com/b/appv/archive/2007/11/14/softgrid-operations-guide-part-2.aspx, dated Nov. 14, 2007.

"Calculating Cachesize" http://www.openldap.org/doc/admin24/tuning.html, copyright 2012.

"Hibernate Notes => Session Cache" http://www.codeweblog.com/hibernate-notes-session-cache/, dated Apr. 13, 2013.

"Estimating the size of a map cache" http://resources.arcgis.com/en/help/main/10.1/index.html#//0154000005nz000000, Copyright © 1995-2013, dated May 21, 2013.

* cited by examiner

STATEMENT CACHE AUTO-TUNING

BACKGROUND

Statement caching is a technique used in many systems to improve performance by caching "prepared statement handles" that are used repeatedly, such as in a loop or in a method that is called repeatedly. Prepared statements are expensive to create from scratch. Creation of a prepared statement involves allocating the client side data structure for the prepared statement handle, and sending the statement text and binding variable metadata to the server. The server parses and semantically analyzes the statement, followed by which the server sends the statement metadata to the client, which is processed by the client and saved away. All of these steps consume CPU on the client and server and also results in additional network traffic, both in the request sent to the server and response received from the server.

For a given SQL statement that is repeatedly executed by the client, it is therefore desirable to avoid repeating all of these steps unnecessarily by keeping the prepared statement handle cached on the client, thereby avoiding the need to recreate it from scratch on every execution. Therefore, statement caching is an important optimization that helps to reduce client and server CPU usage and also helps reduce network traffic.

The size of the prepared statement cache for a user's session determines how many prepared statement handles may be cached for the user session. Thus, it is important for the size of a session cache to be the right size. Too small a cache can result in contention between statements vying to occupy space in the cache, thereby resulting in thrashing in the cache, which can result in performance issues, negating the benefits of statement caching.

However, if the cache is too large, then the cache may occupy more memory on the client than needed, and holding on to more resources on the server as well (as the server needs to keep some state around for each prepared statement cached on the client). Overall memory usage on the client and server will be greater, resulting in less memory available for other client and server processes. Other software on the client and server may not be able to obtain needed memory, potentially causing degradation of overall system performance, both on the client and the server.

A static cache size is often insufficient because the demands of each session may change over time. For example, certain sessions may process more statements, thus requiring more memory, during certain times of the day, or certain times of the week. Thus, there is a need to dynamically increase or decrease the statement cache size based on the amount of activity a session is experiencing.

One option is to have an application developer programmatically tune the cache. A system may periodically return metrics, such as client CPU usage, server CPU usage, and network statistics, to the application developer, who may then determine how the session caches will be resized. However, this process may be error-prone and time consuming, and often incurs a great deal of programming overhead, especially for systems with a large number of sessions.

Thus, there is a need for a client side statement cache system that can automatically allocate or restrict cache memory as needed dynamically in response to changing workloads. This may be based on some specific overall constraints, for example, on how much memory can be used for the purposes of caching prepared statements on the client.

SUMMARY

Some embodiments of the invention address the above problems using a method and apparatus that automatically resizes statement caches in response to cache metrics. One embodiment provides an approach for periodically calculating a session eligibility index for each session cache, wherein the session eligibility index indicates the priority level of the session cache for resizing, and selecting and resizing one or more cache sessions based at least in part on the session eligibility index.

Further details of aspects, objects, and advantages of the invention are described below in the detailed description, drawings, and claims. Both the foregoing general description and the following detailed description are exemplary and explanatory, and are not intended to be limiting as to the scope of the invention.

DETAILED DESCRIPTION

Figure 1A:
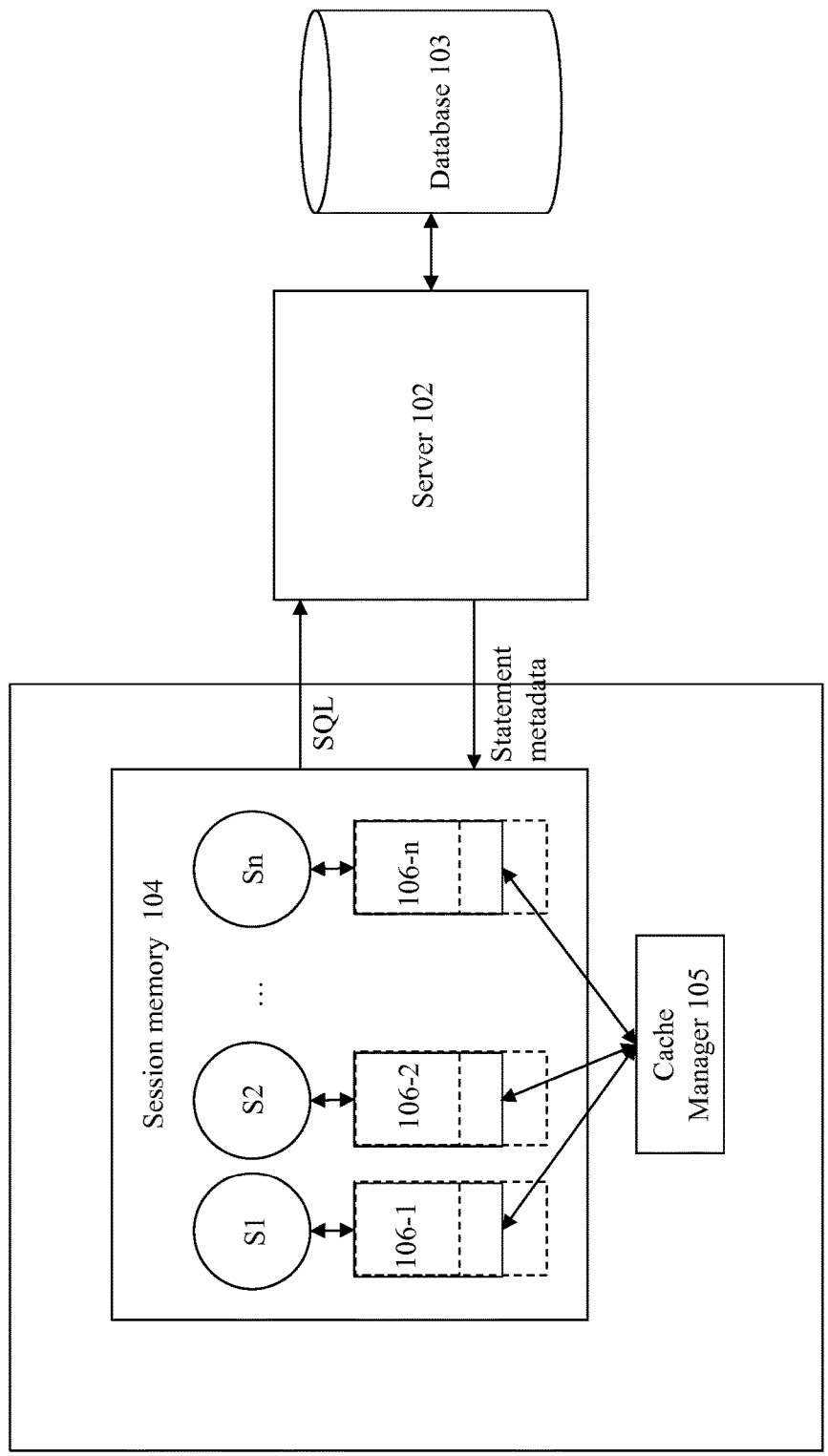
FIGS. 1A-B illustrate example architectures of systems for implementing auto-tuning for statement caches in accordance to some embodiments of the invention.

Various embodiments are described hereinafter with reference to the figures. It should be noted that the figures are not drawn to scale and that the elements of similar structures or functions are represented by like reference numerals throughout the figures. It should be noted that the figures are only intended to facilitate the description of the embodiments. They are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

Some embodiments of the invention address the above problems by providing a cache manager that periodically resizes session caches based on metrics indicating how well a session is performing. The cache manager may select sessions caches that are performing the poorest, and thus in the most need for more memory, to be allocated additional memory. Also, when memory usage exceeds a threshold, the cache manager determines which sessions should have their cache size reduced and by how much.

FIG. 1A illustrates an architecture of a system for implementing auto-tuning for statement caches in accordance to some embodiments of the invention. Client 101 contains one or more sessions 104, which may access data on database 103 by sending queries to be processed by server 102. These sessions 104 on client may also update data on database 103 by sending commands (e.g., SQL commands) to be processed on server 102.

Figure 1B:
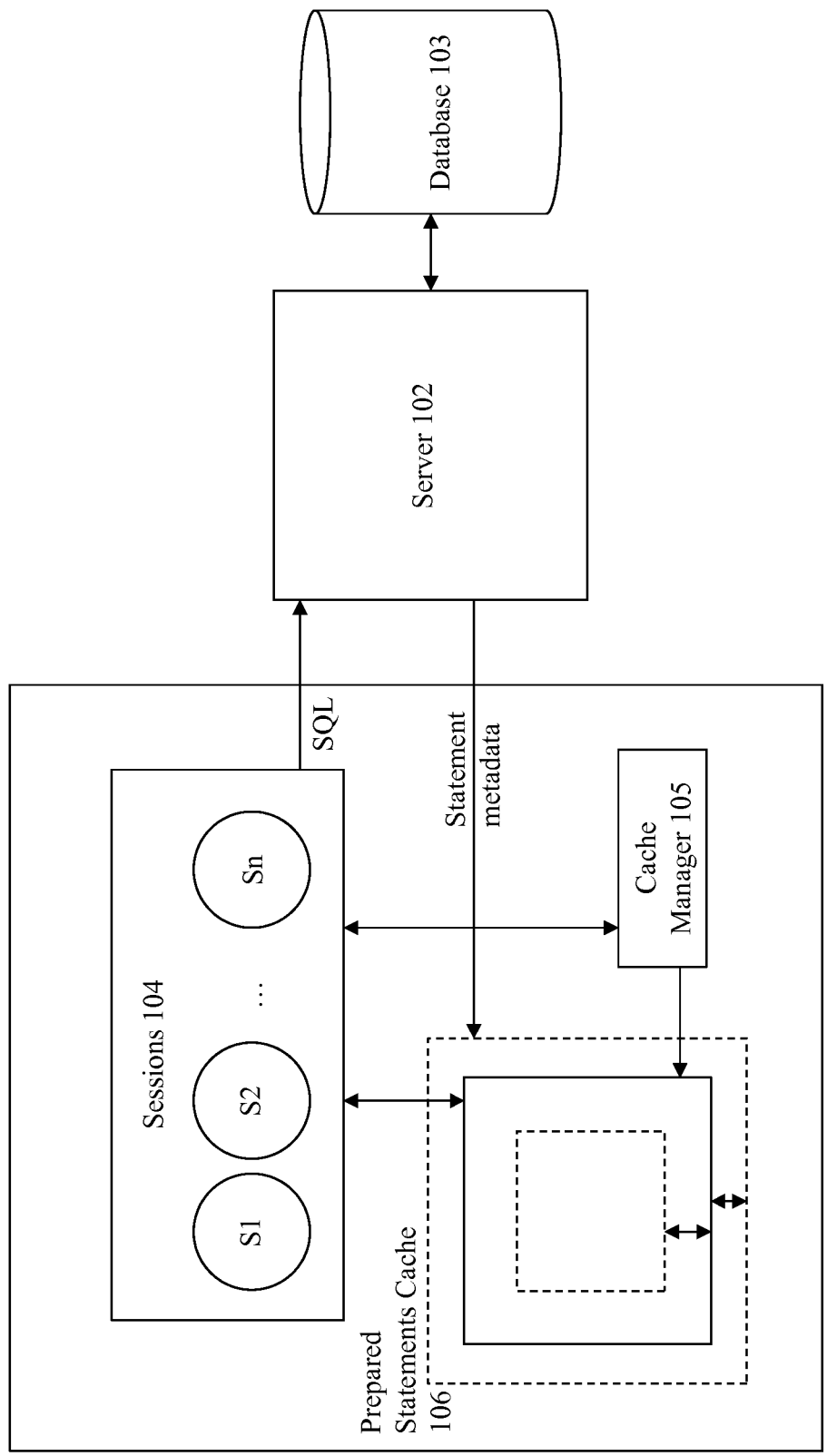

In some embodiments, each session S1 through Sn may have its own private session cache (106-1 through 106-n). Private caches 106-1 through 106-n are tunable to be larger or smaller depending upon the needs of the session. FIG. 1B illustrates an alternate embodiment where the memory for the caches 106 is located within the global memory of the client. In some embodiments, there may be limits on the size of each session cache. There may also be a cache limit restricting the total size of the caches used by the sessions. These limits may be in terms of memory used or number of statements.

Caches 106 store metadata for the statements generated by the sessions. By keeping the statement metadata within the client, the statement will not need to be re-parsed each time the statement is executed on the server. As the re-parsing of statements has a non-trivial cost, prepared statement caches help to reduce server to client network traffic and re-parsing of previously executed statements.

During operation, each session prepares statements, executes the prepared statements and finally releases statements when they are no longer needed. When a client prepares a statement that is already in the cache, it simply reuses the cached statement. When a client prepares a statement that is not already in the cache, it does a full statement prepare and then adds the new statement to the cache. Eventually, this may cause the cache size of the session to exceed its size limit. When this happens, the cache frees up some of its memory by evicting one or more of the already released statements. This may be done with a least recently used (LRU) scheme, wherein the statements that were the least recently used by the session are removed first.

Once a statement is evicted from the cache, a subsequent attempt to prepare the same statement will result in a cache miss. Misses in the statement cache are generally indicative of the need to increase the statement cache size. However, when session usage decreases, the cache may have more allocated memory than is needed to store the statements being prepared by the session, memory which may be better allocated to other session caches or other client processes.

The client 101 also contains a cache manager 105. Cache manager 105 is responsible for automatically adjusting the size of the session caches 106 in response to session activity. In some embodiments, the cache manager 105 is configured to periodically perform a resize operation, increasing or decreasing the amount of memory allocated to each session cache depending on how well the cache is performing and the total amount of cache memory available. In some embodiments, cache manager 105 may be configured to perform a resize operation as needed, such as in response to a user input, or when session performance or memory usage reaches a certain level.

Figure 2:
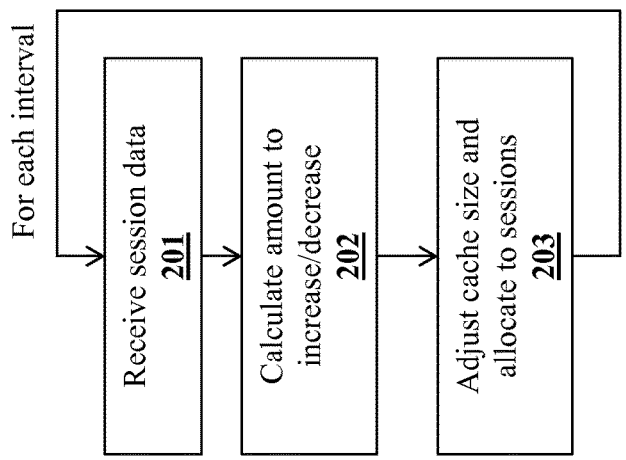
FIG. 2 illustrates a flowchart for a process for auto-tuning cache sizes in accordance with certain embodiments of the invention.

FIG. 2 illustrates a flowchart for a process for auto-tuning cache sizes in accordance with certain embodiments of the invention. In some embodiments, auto-tuning the cache size takes place at periodic intervals. For example, in some systems, the size of the cache may be updated once every minute.

During each interval, the system runs through 201 through 203. At 201, data from sessions is received. In some embodiments, the cache manager accesses each session to extract the necessary data from the session. In other embodiments, sessions may periodically report data, which is then accessed by the cache manager.

At 202, the data from the sessions is used to calculate the amount that cache sizes for the sessions will be increased or decreased. In some embodiments, this first involves a determination whether the system is in memory pressure mode. Memory pressure mode indicates that the system is using too much memory, and so memory for the session caches should be decreased. This may happen, for example, when one or more sessions are allocating memory for new statements in the session cache more frequently than releasing statements from the cache. In some embodiments, a system may enter memory pressure mode if the total memory used by the session caches exceeds a certain pre-configured or dynamically enforced limit. Memory pressure mode may be also entered if one or more sessions exceed any per session limit.

If the system is determined to not be in memory pressure mode, then the memory allocated to the session caches may be increased. If the system is determined to be in memory pressure mode, then session cache sizes will be decreased. In some embodiments, if it is determined that the performance of all session caches falls within an acceptable range, no increase or decrease will occur. An example of an acceptable range could be zero cache misses for all sessions since the last resize operation and all cache sizes being within operating limits.

At 203, cache size is adjusted and allocated to sessions. In some embodiments, the cache manager sends commands to each session cache, instructing the session cache of the change in cache size. In other embodiments, the cache manager performs the resize itself, such as by freeing statements in a cache when reducing memory. For example, when decreasing memory for a session cache, the cache manager may release statements from the caches being decreased. Once the resize has been completed, the resize cycle ends, and the system may wait the end of the next interval to begin a new resize cycle.

In some embodiments, the system increases or decreases the cache size for sessions based on a session eligibility index. The session eligibility index is a value based on metrics extracted from each session that serve as an indicator as to how well the session cache is performing. These metrics may include current level of cache activity, user privileges for the session, the amount of memory currently used by the cache, number of misses experienced by the cache, local cache size limits, etc.

For example, in some embodiments, the session eligibility index may be calculated by dividing the total memory used by all statements cached by the session by the current performance of the cache. The performance of the cache may be measured by the number of cache misses since the last resize cycle. Using this example, if the ratio of the size of the session's cache to the number of misses seen by the cache is high, a high session eligibility index would be calculated, indicating that the cache is performing well. On the other hand, the session eligibility index being low would indicate that the cache is experiencing many misses relative to the size of the cache, and may be in need of an increase in cache memory size. Thus in this embodiment, the lower the session eligibility index is for a particular session, the higher the priority for increasing the cache memory for that session. Similarly, the higher the session eligibility index is for a particular session, the higher its priority for relinquishing memory when the system is in memory pressure mode.

The session eligibility index may be further modified by additional data, such as a user ranking. For example, the system may be configured so that certain users would be prioritized over others and should receive additional memory for their sessions first. In such an embodiment, the session eligibility index may be determined by multiplying a number representing user priority to the memory used to misses ratio discussed above. A higher priority user would have a lower number representing user priority, so that the session eligibility index will be lower, and thus resulting in a higher priority for receiving more memory. For example, near the end of a fiscal year, sessions performing finance operations may receive higher priority than sessions performing work in other areas, such as human resources. In such an example, a session performing financial operations may receive additional cache memory before a session performing human resources operations, even though the human resources session is performing more poorly than the finance session.

In some embodiments, the cache size may be in memory units or number of statements in cache. The cache manager may specify commands for sessions to resize their caches in terms of memory units or number of statements. If specified in memory units, the session may translate memory units into number of statements for example using the formula of:

$$\text{number of statements} = \frac{\text{number of memory units}}{\text{average memory size of statements}} \quad (1)$$

For below discussion, cache size is given in memory units as illustration, not restriction. In addition, some figures will use the ratio of the cache memory size to the number of cache misses as the session eligibility index. Those skilled in the art will understand that other methods for calculating a session eligibility index may be used in the examples. For example, in some embodiments, sessions with higher session eligibility indices could mean higher priority for resources, as in memory allocation.

Cache Manager w/Request/Response System

Figure 3A:
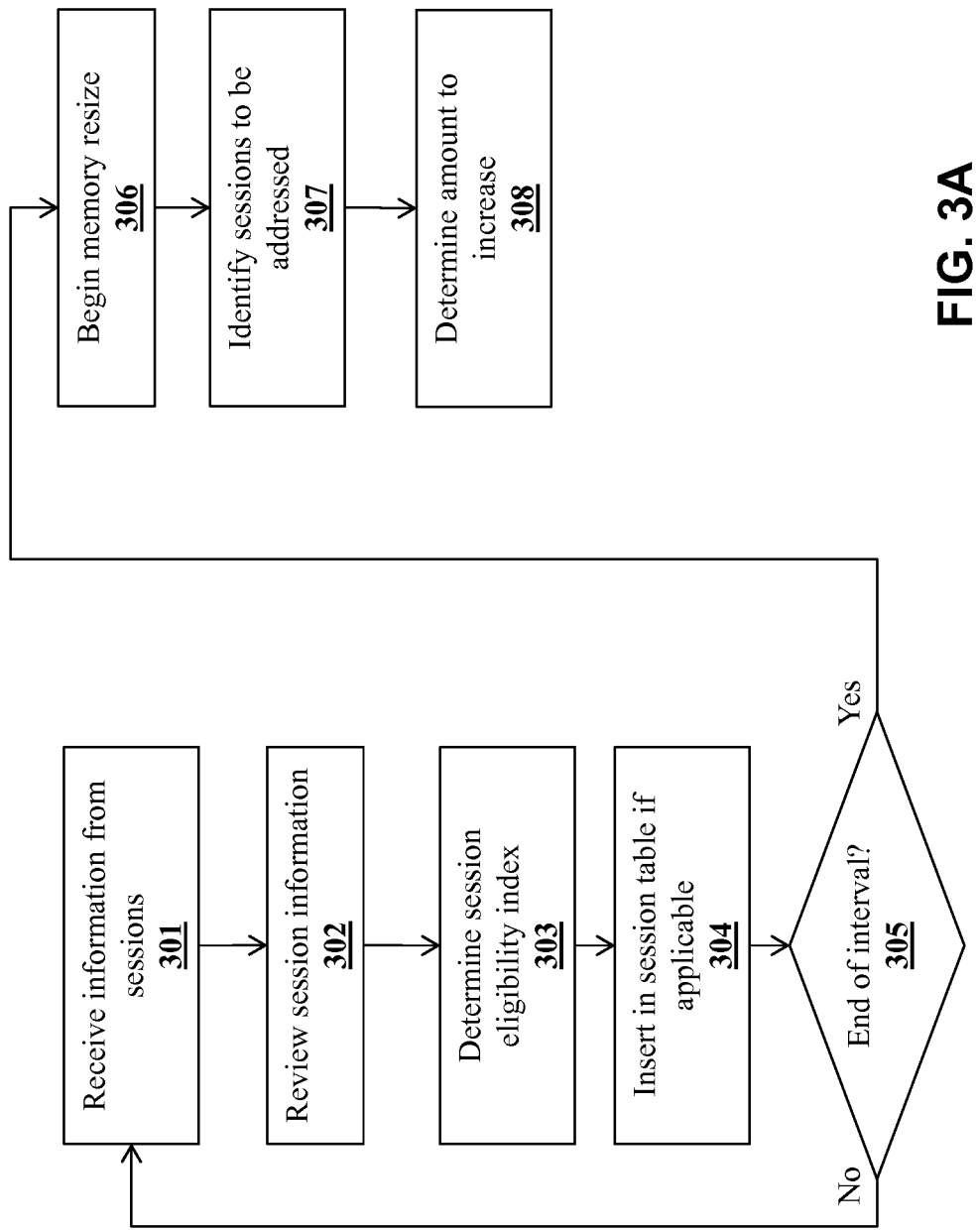
FIG. 3A illustrates a flowchart for a process for auto-tuning cache sizes using a request/response system in accordance with certain embodiments of the invention.

In some embodiments, the cache manager may operate on a request/response system. FIG. 3A illustrates a flowchart for a system where the cache manager uses a request/response system. In a request/response system, each session periodically calculates its session eligibility index. In some embodiments, the sessions sort themselves without input from the cache manager to determine which sessions caches should be resized during the next resize cycle. The cache manager then retrieves these results and resizes the caches accordingly.

At 301, sessions determine the metrics used to calculate the session eligibility index. For example, for the session eligibility index described above, the size of the session cache and the number of misses since the last resize would be determined. Each session updates its metrics periodically. Typically, the period between each update will be less than or equal to the period between each resize cycle. At 302, the data from the session is used to calculate the session eligibility index for that session.

At 303, the calculated session eligibility index is used to determine whether the session will be resized during the next resize cycle. In some embodiments, all sessions may be resized, but this may not always be practical in systems with a large number of sessions. In other embodiments, only a certain number of sessions may be resized per cycle. The number of sessions to be resized may be a set number (e.g., 5 sessions per resize cycle), or may be a percentage of the total number of sessions (e.g., 10% of all sessions per resize cycle).

A table, list, or other data structure (hereinafter referred to as an allocation list) may be maintained that specifies the sessions that will be resized in the next cycle. The allocation list will typically contain a limited number of slots or entries corresponding to the number of session caches that may be resized per resize cycle. When a session has calculated its session eligibility index, it is determined whether the session should be on the allocation list, by comparing its index to the indices of the sessions already on the list. For example, if the session A's eligibility index is lower than the highest eligibility index on the allocation list (meaning that session A is performing poorer and thus in more need of additional memory), then session A is inserted into the allocation list and the session with the highest eligibility index is removed from the allocation list. For instance, if the allocation list contains three entries (corresponding to three sessions being resized per resize cycle) with the sessions having eligibility indices of 5, 10, and 15, and session A has an index of 12, then the session with an index of 15 will be removed from the allocation list, and session A with eligibility index of 12 is added to the allocation list. If instead session A has an index of 20, indicating that it is performing better than the sessions already on the allocation list and thus less in need of additional memory, session A will not be added to the allocation list, which will remain unchanged.

In some embodiments, the allocation list may be sorted by session eligibility index. In other embodiments, the list will be unsorted, but the system will maintain a value corresponding to the session with the highest index on the list, so that only one comparison would need to be done to determine if a session should be on the list or not. During memory pressure, the system can maintain a value corresponding to the session with the lowest index on the list to quickly determine if this session should have its memory reduced in the next resize cycle.

At 304, if the end of the resize interval has not yet been reached, the system continues to wait for more sessions to update their information. At the end of the resize interval, the process moves to 305.

At 305, if the end of the resize interval has not yet been reached, the system continues to wait for more sessions to update their information. At the end of the resize interval, the process moves to 306.

At 306, the cache manager begins the memory resize cycle. First, at 307, the cache manager determines which sessions will be resized. This may be done simply by reading from the allocation list. Next, at 308, the cache manager determines how much the memory for each session cache will increase or decrease. In some embodiments, this is determined by comparing the session eligibility indices of the session caches to be resized. For example, one formula that may be used by some embodiments to calculate the increase amount for a session cache Sn may be:

$$Mn = \left(\frac{1/Xn}{\sum 1/Xi}\right)M \quad (2)$$

wherein Mn is how much memory session cache Sn will be increased by, Xi is the session eligibility index for session cache Si, and M is the total amount of additional memory available for allocation in a given resize cycle. For example, if sessions S1, S2, and S3 are to be increased, and have session eligibility indices of 5, 10, and 15, respectively, then S1 would be increased by 55% of M. In some embodiments, M may be the total amount of additional memory available. However, other embodiments may choose M to not exceed a certain percentage (e.g., 20%) of the total amount of additional memory available. This would be done to avoid sudden spikes in allocation based on very transient activity.

In addition, some embodiments will have an upper bound for how much a session's cache size may be increased per resize cycle. It may be specified that a session cache may only be increased up to a set amount per resize cycle. Alternatively, a session cache may only be increased up a set percentage per resize cycle. For example, it may be specified that a session cache size cannot be increased by more than 20% per resize cycle. If a session has a size of 20 memory units before the resize cycle, then it can only be increased by up to 4 memory units in that resize cycle. This requirement helps prevent sudden but brief spikes in session activity from causing a session cache to be allocated too much memory by the cache manager.

Some embodiments may also include a lower bound for how much a session cache can be increased, which may also be either a set amount or a percentage of the size of the cache. For example, a session cache, if selected for memory increase in a resize cycle, may be required to increase by at least 5 memory units. This measure helps prevent the same session from having to repeatedly request more memory in a short period of time.

After the cache manager has determined how much memory to grant to each session, the cache manager sends resize commands to the selected sessions. Once the selected sessions have responded to the command and resized accordingly, the resize cycle ends and the next interval begins.

If the system is in memory pressure mode, the process is similar. Instead of an allocation list with the sessions with the lowest session eligibility indices, the system instead looks for sessions with the highest indices, indicating that they are performing well and can be made to use less memory. The system may use the same allocation list as for increasing cache sizes, or it may maintain a separate allocation list for decreasing cache sizes during memory pressure mode. As session eligibility values are calculated, the sessions with the highest values are placed on the allocation list.

The cache manager may then determine how much to decrease the selected session caches by. In some embodiments, the following formula may be used that determines how much memory a session cache Sn should relinquish based on the value of its session eligibility index:

$$Mn = \left(\frac{Xn}{\sum Xi}\right)M \quad (3)$$

wherein Mn is how much memory session cache Sn will be decreased by, Xi is the session eligibility index for session cache Si, and M is the amount of memory to be reclaimed in a given resize cycle.

Upper and lower limits may also be imposed when decreasing cache sizes. For example, in some embodiments, a session cache may only be allowed to be reduced by 20% per resize cycle. This helps to spread the cost of decreasing total cache memory across a larger number of session caches. In addition, some embodiments may choose M to not exceed a certain percentage (e.g. 20%) of the total amount of memory to be reclaimed. This would be done to avoid large changes in allocation based on very transient changes in activity.

The request/response method of using a request/response system has a number of advantages. First, less memory will generally be used for resize operations because only a few sessions are analyzed at a time. In systems where there is less memory available, the method ensures that at least a few sessions will be able to receive more memory with which to improve performance. Resize commands can be processed quicker if the number of sessions resized per cycle is small.

The disadvantage of the request/response system is that the cache manager needs to wait for sessions to request and respond to memory resize commands. If some sessions do not respond to the cache manager's memory resize commands, the resize cycle may be delayed.

Cache Manager w/o Request/Response System

Figure 3B:
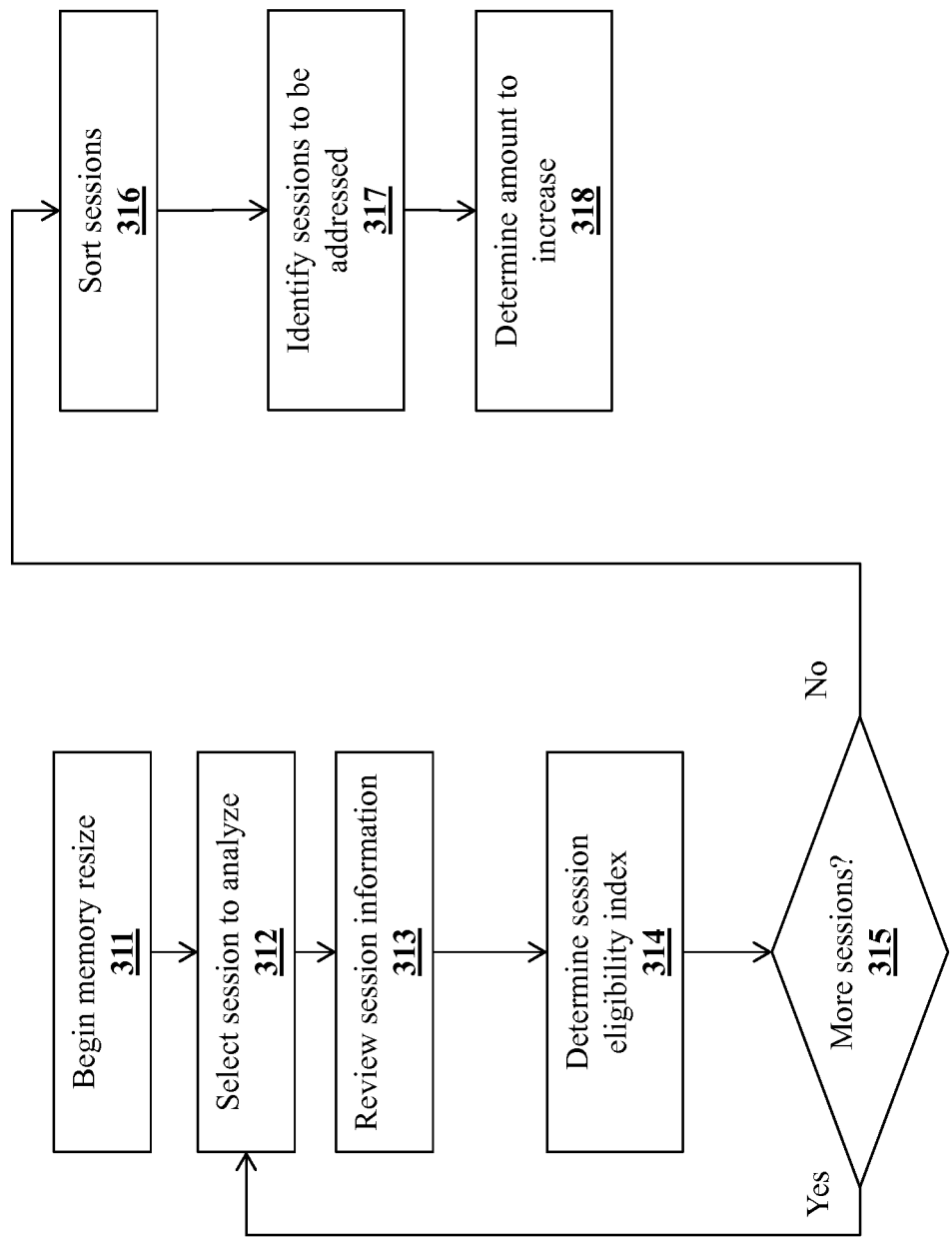
FIG. 3B illustrates a flowchart for a process for auto-tuning cache sizes without a request/response system in accordance with certain embodiments of the invention.

FIG. 3B illustrates a flowchart for a system where the cache manager does not use a request/response system. In this system, the cache manager accesses the session caches directly and performs the calculations to determine which caches to resize and by how much.

At 311, the cache manager initiates the memory resize process. This may require placing locks on the eligible sessions or their caches (refer to FIG. 1A-B). In order to determine how memory is to be increased or decreased, the cache manager must determine the session eligibility indices of the sessions. At 312, the cache manager selects a session to analyze. At 313, data from the session is received from which a session eligibility index may be calculated. This may include information on the current size of the session, as well as session history and statistics, which may include the number of misses experienced by the session. Once the necessary data has been extracted, the session eligibility index for the session is calculated at 314.

At 315, the cache manager may determine whether there are more sessions to be analyzed. If there are, 312 through 314 are repeated for a new session, until all eligible sessions have been accessed by the cache manager and a session eligibility index calculated for each one.

Once all sessions have been analyzed and their session eligibility indices have been calculated, the cache manager may sort the sessions by session eligibility index at 316. In some embodiments where the cache manager resizes all of the available sessions, sorting may be skipped.

At 317, the cache manager determines which sessions will have their memory increased. The number of sessions that will receive more memory may be a set value, or it may be based on the total number of sessions requesting resize (e.g., a percentage of the number of sessions). The cache manager may look at the sorted list of sessions, selecting for resize the session with lowest session eligibility indices, indicating that they are performing the poorest and thus have the highest priority for receiving new memory.

At 318, the cache manager determines how much additional memory will be allocated for each session. This determination may be similar to the method used by the system with the request/response system as described above, wherein the amount of additional memory allocated to a session is inversely proportional to the session eligibility index of the session. Once the determinations have been made, the cache manager can increment the session cache size itself. In another embodiment, the cache manager sends commands to the selected sessions to increase their local cache size. The cache manager then releases any session locks that were acquired, and the resize cycle ends.

If the system is in memory pressure mode, the cache manager will decrease session cache sizes instead of increasing. The process for decreasing cache memory sizes is similar to the process for increasing. During memory pressure the cache manager sorts the session caches by decreasing session eligibility index instead of increasing, so that sessions with higher session eligibility indices will be selected for decreasing memory. The cache manager may decrease the memory of a cache by freeing unused statements in the selected cache. In another embodiment, the cache manager may send commands to sessions to reduce memory.

By not using a request/response system, the cache manager does not have to wait for sessions to request memory or for sessions to respond to memory resize commands. However, because each resize operations considers all sessions, more memory may be required per cycle if the number of sessions is large. In addition, because all sessions are considered, there may be delays due to the cache manager needing to obtain session locks on all sessions.

Example Embodiments

FIG. 4 illustrates an example embodiment of a resize cycle where memory is increased using a request/response system. FIG. 4A illustrates an example of a system at the start of the process. Client 401 comprises a plurality of sessions 402. Each session, S1 through S5, has a session cache within cache 403. As shown in the figure, the session caches currently use a total of 130 units of memory, while the total cache size limit is 150 units of memory.

Figure 4A:
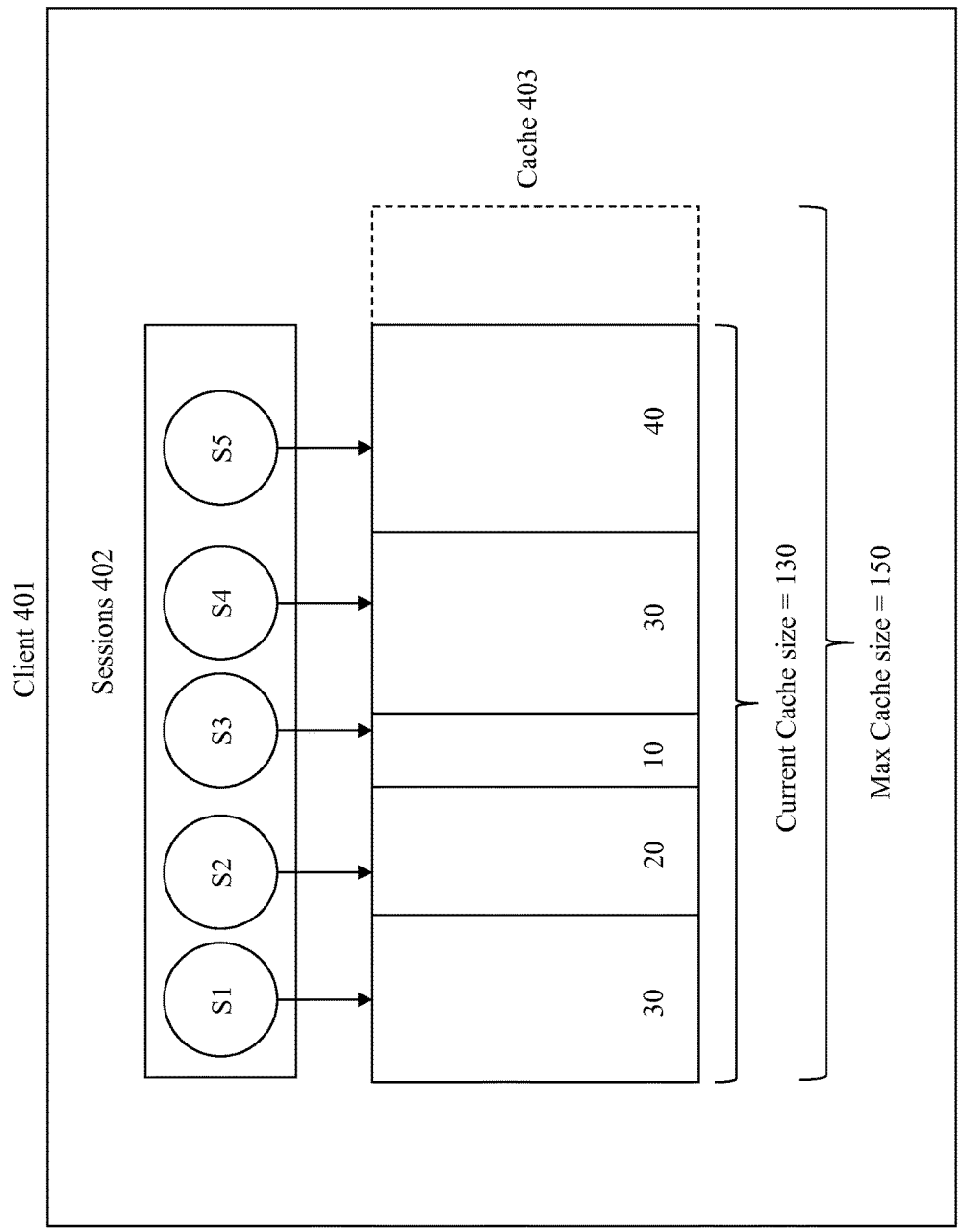
FIGS. 4A-K illustrate an example of a resize cycle using a request/response system.
Figure 4B:
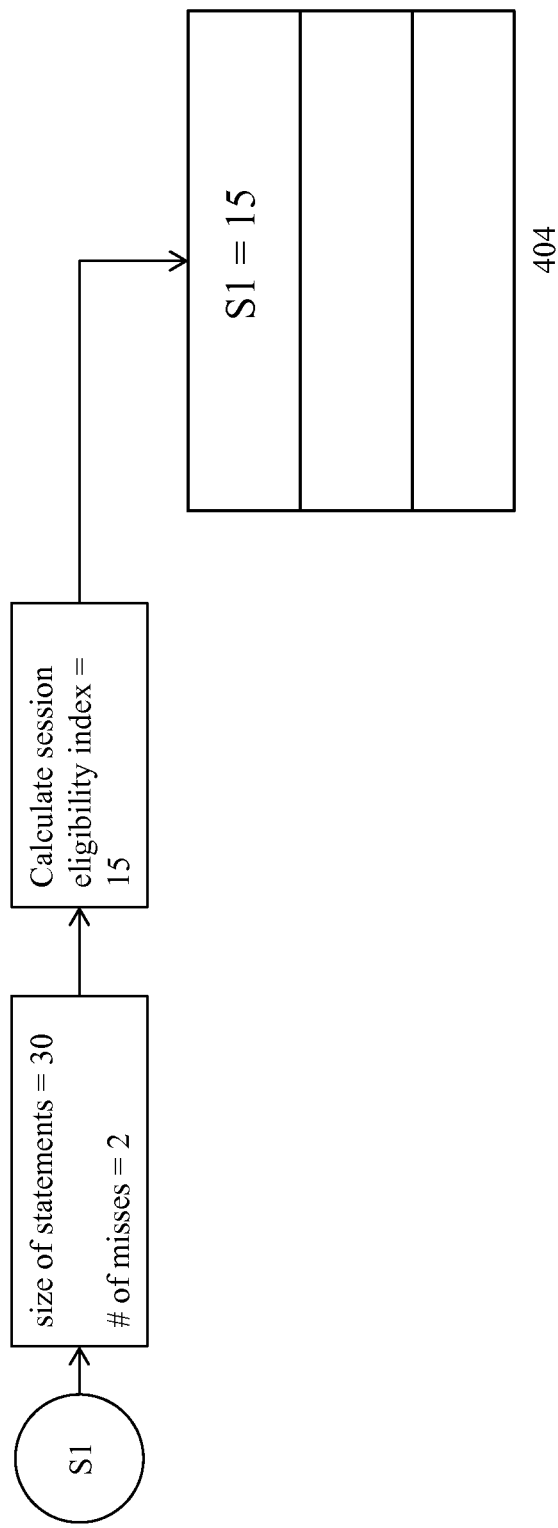
Figure 4C:
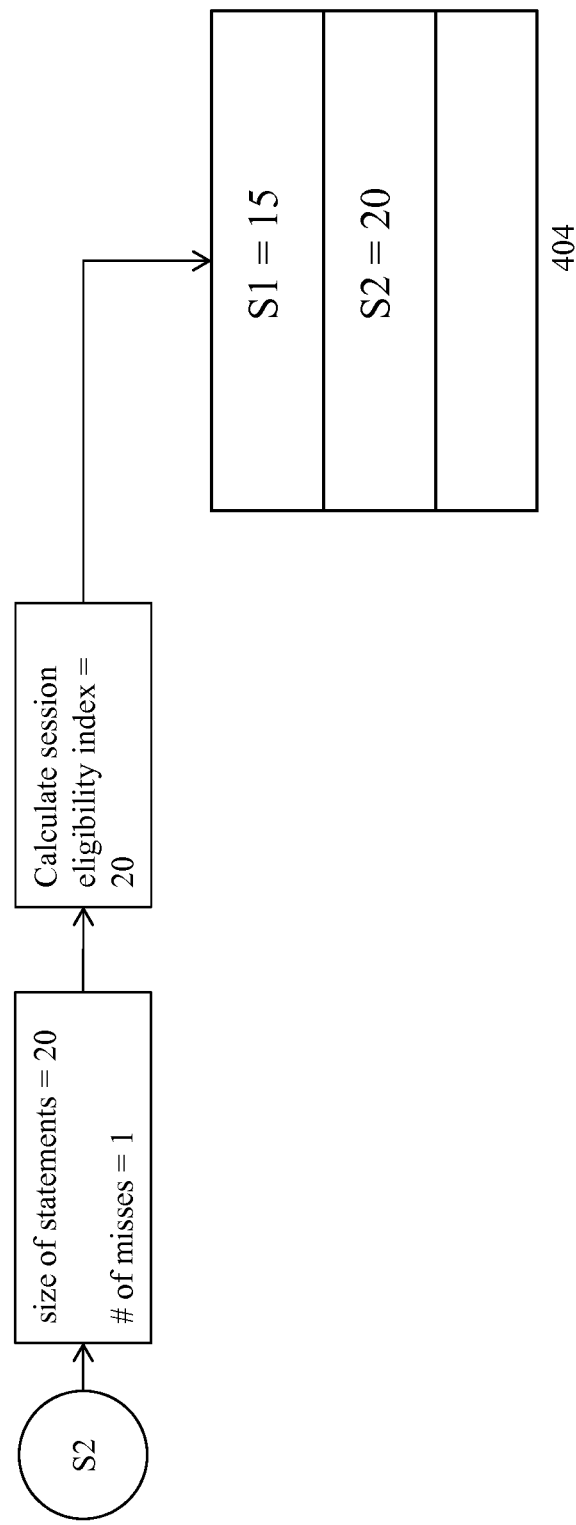
Figure 4D:
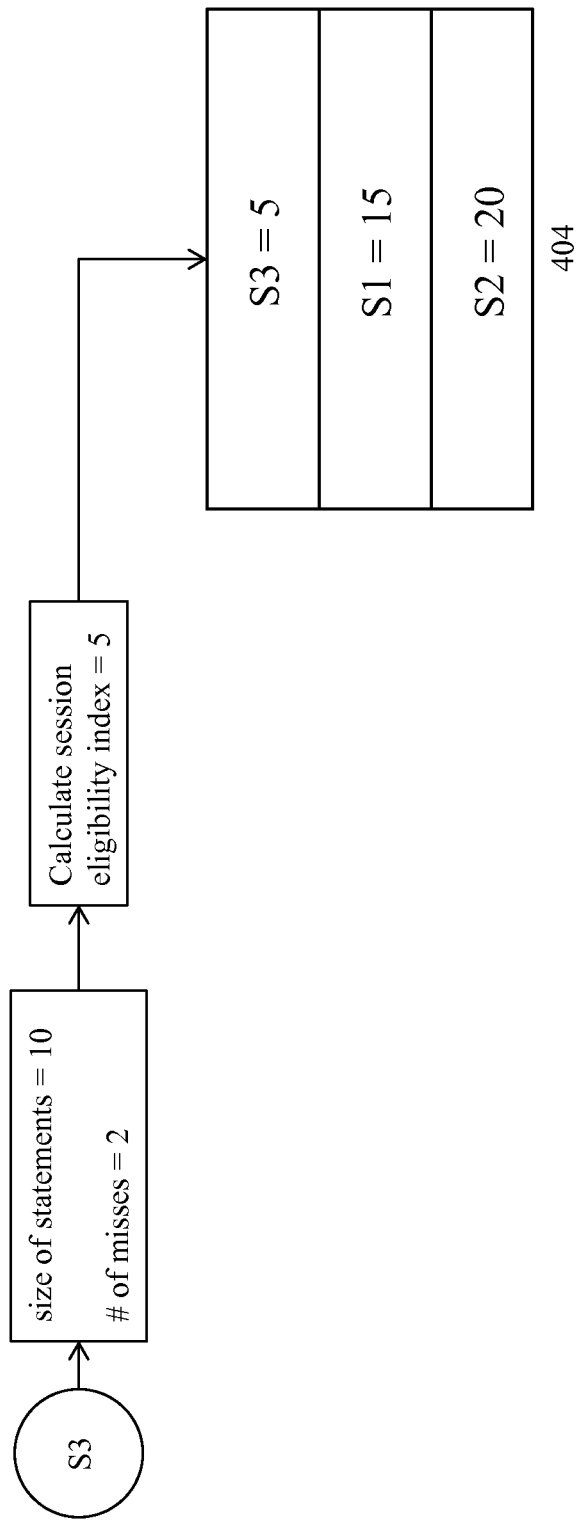

FIGS. 4B-F illustrate each session calculating a session eligibility index and determining whether or not it will be on the allocation list 404, which contains three slots, meaning that three session caches may be resized per resize cycle. In FIGS. 4B-D, the session eligibility indices for S1-3 are determined and placed into allocation list 404.

Figure 4E:
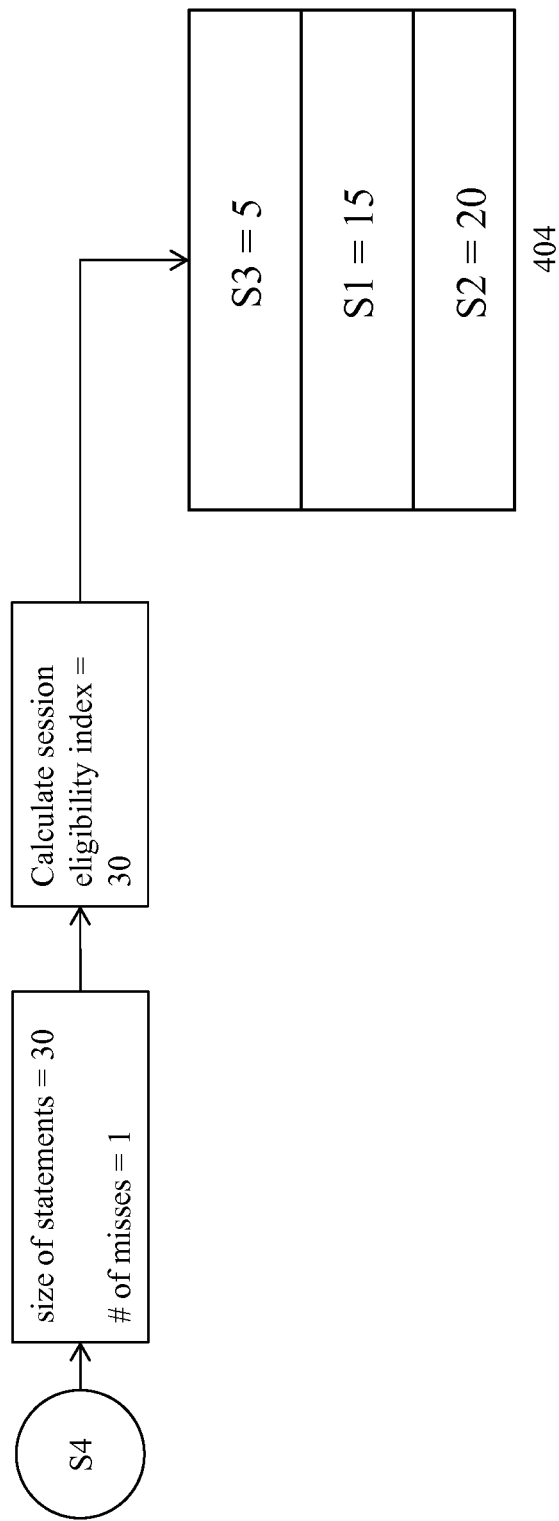

In FIG. 4E, the session eligibility index of session S4 is calculated. Because the index for session S4 is higher than those of the sessions already in the allocation list, indicating that S4 is performing better than the sessions on the allocation list and is in less need of a memory resize, session S4 is not placed into the allocation list 404, which remains unchanged.

Figure 4F:
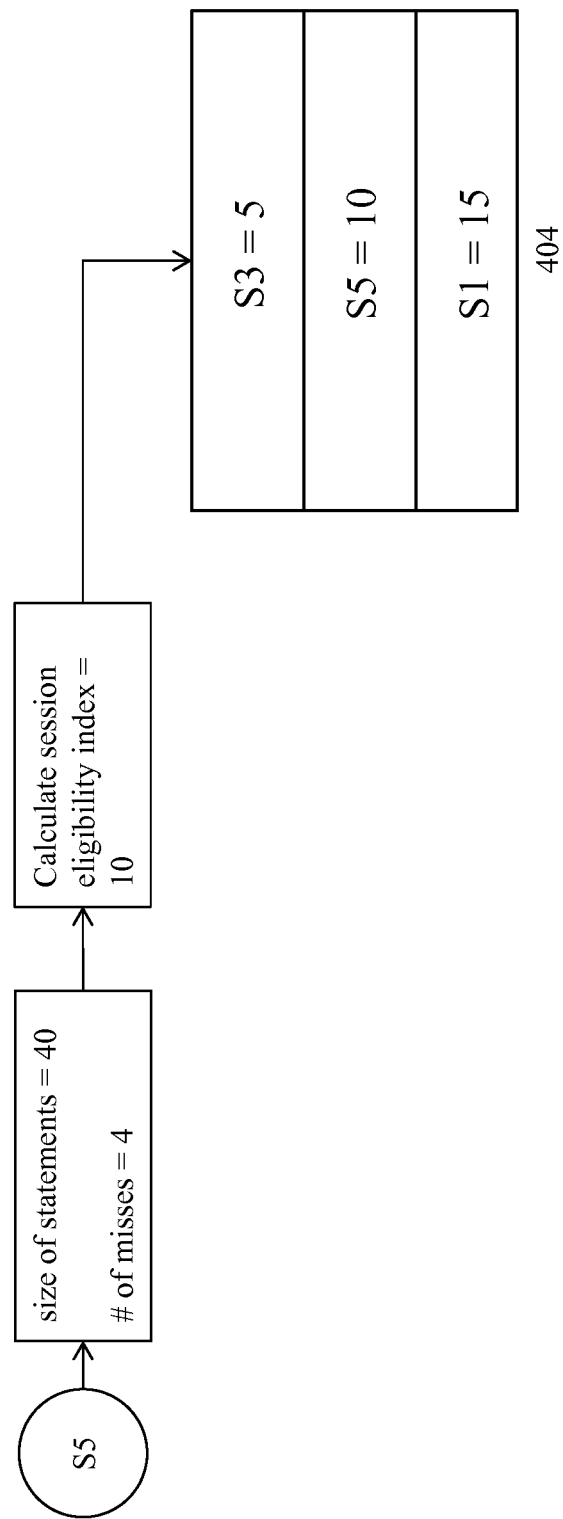

FIG. 4F illustrates calculating a session eligibility index for session S5. Because session S5 has a session eligibility index lower than the session in the allocation list with the highest index (S2), session S5 is placed in allocation list 404, while S2 is removed.

Figure 4G:
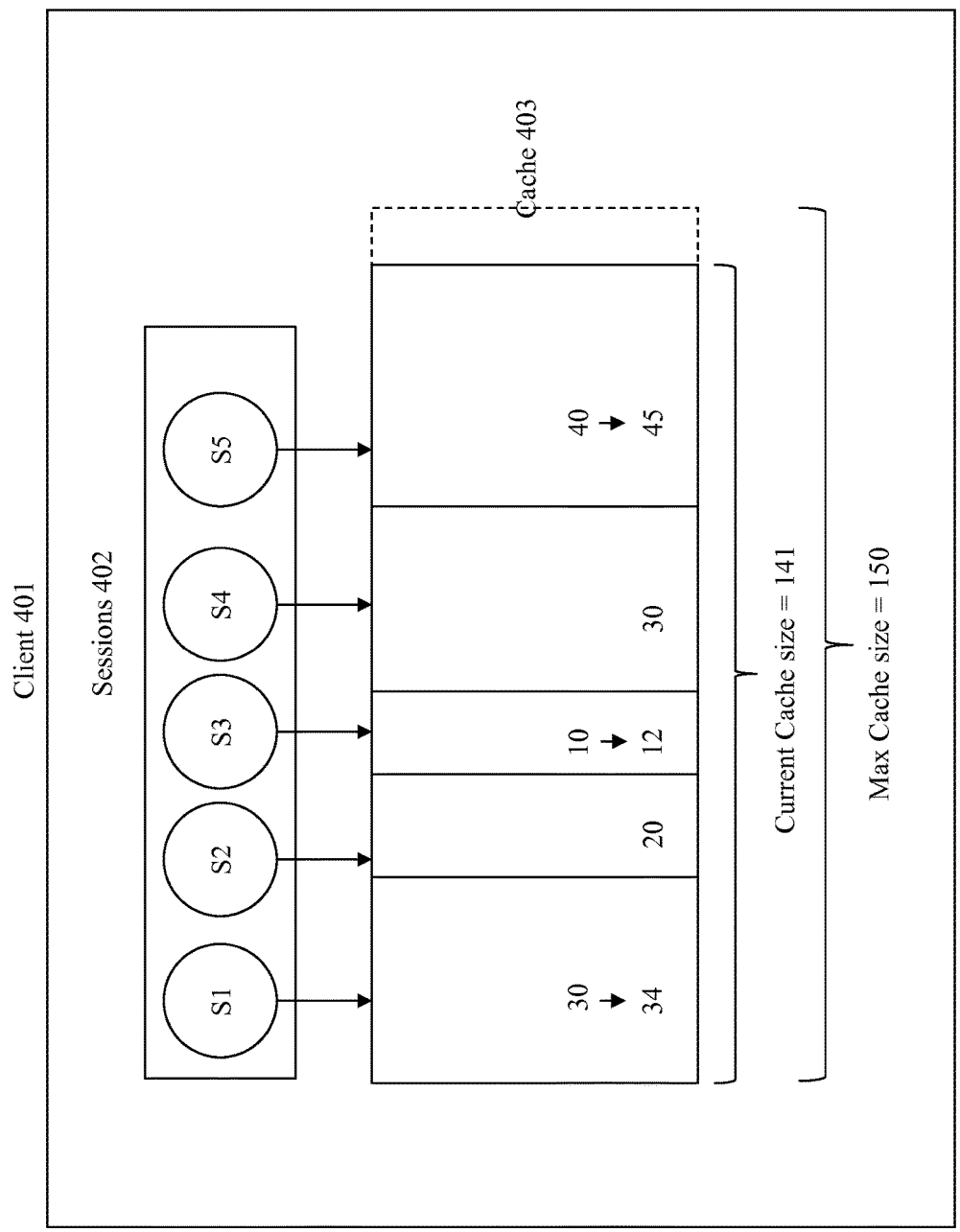

FIG. 4G illustrates the result of the memory resize. As shown by the final allocation list 404 in FIG. 4F, the cache manager will resize sessions S1, S3, and S5. Because the session caches currently use 130 units of memory, while the total cache size limit is 150 units of memory, the cache manager may allocate up to 20 units of memory to the sessions.

If the system uses the formula (2) for increasing memory described earlier, sessions S1, S3, and S5 would be allocated (rounded to the nearest memory unit) 4, 11, and 5 additional memory units respectively. However, if there is a requirement that a session may only be increased up to a certain percentage, for example 20%, per resize cycle, then S3, currently sized at 10 memory units, would not be able to receive 11 additional memory units. Instead, S3 would only receive 2 additional memory units (20% of 10). Thus, at the end of the resize cycle, S1 would receive 4 memory units, while S3 receives 2 memory units, and S5 receives 5 memory units. The session caches use a total of 141 units of memory. Because this is under the total memory limit of 150 units of memory, the system does not go into memory pressure mode, and size of the caches may be further increased in the subsequent resize cycle.

Figure 4H:
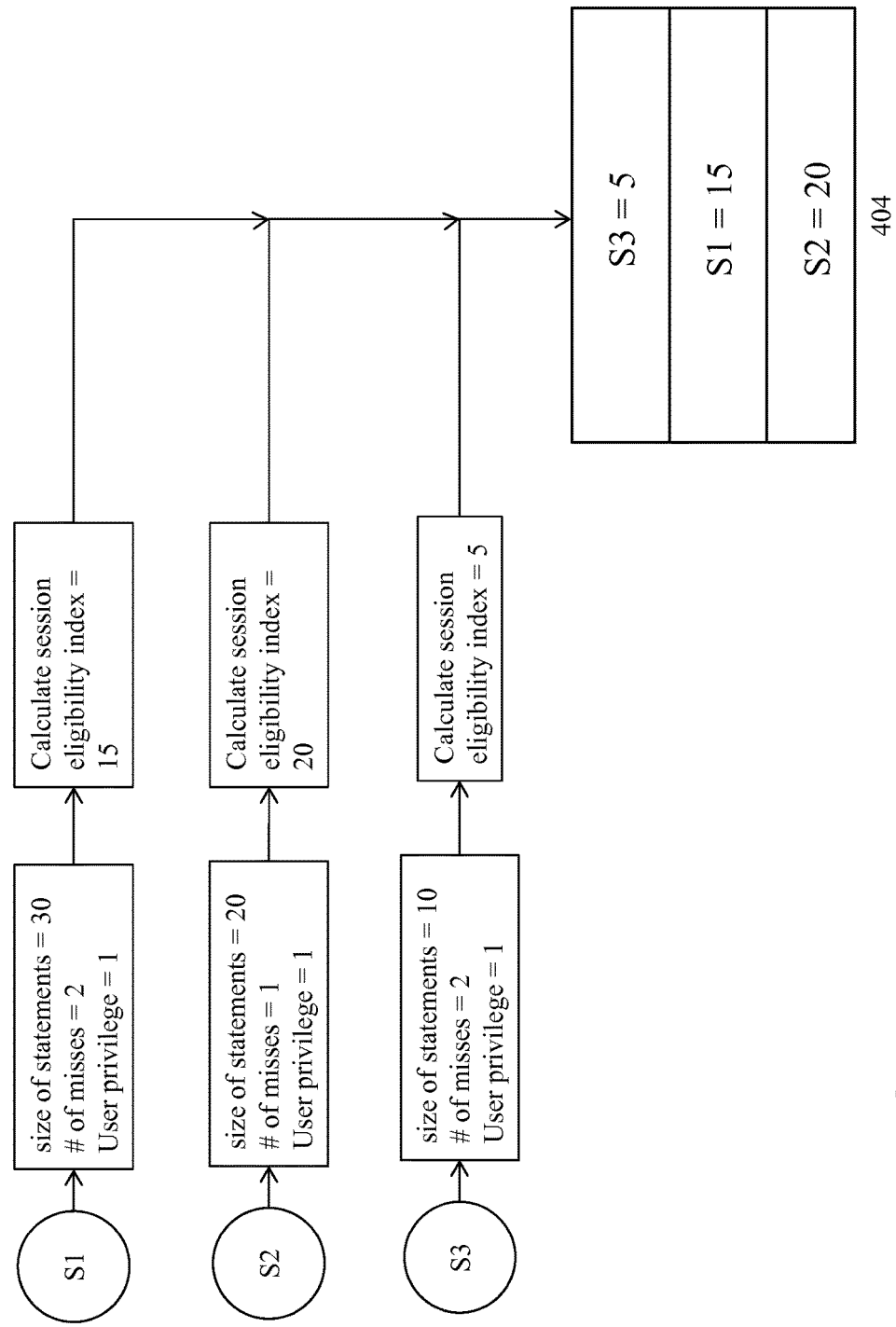

FIGS. 4H-K illustrates an alternate example wherein user privilege is an additional factor used to calculated session eligibility indices. In this example, the session eligibility index is calculated by multiplying a user privilege level with the ratio of cache size to cache misses. A higher ranking user privilege will have a lower value. FIG. 4H illustrates sessions S1, S2, and S3 calculating their session eligibility indices and being placed in allocation list 404. Sessions S1, S2, and S3 all have a user privilege value of 1.

Figure 4I:
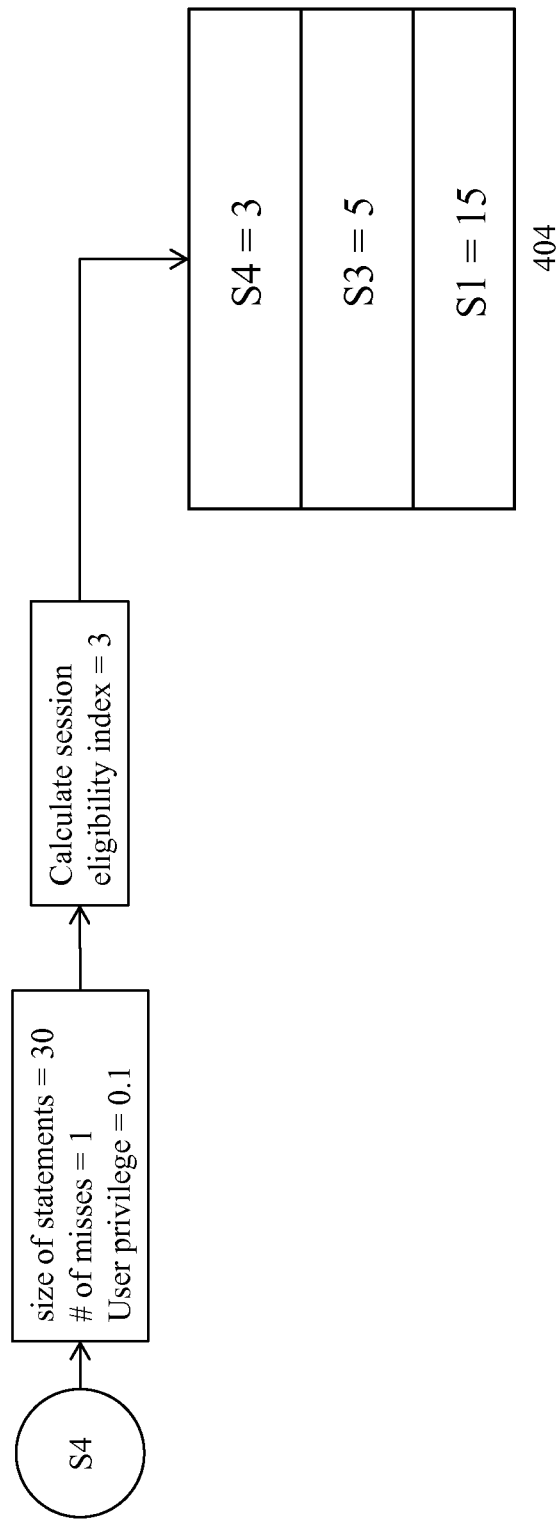

In FIG. 4I, the session eligibility index of session S4 is calculated. Because session S4 has a high ranking user privilege value of 0.1, session S4 is placed on the allocation list 404 to receive more memory, despite having a better cache size to misses ratio than sessions S1-3.

Figure 4J:
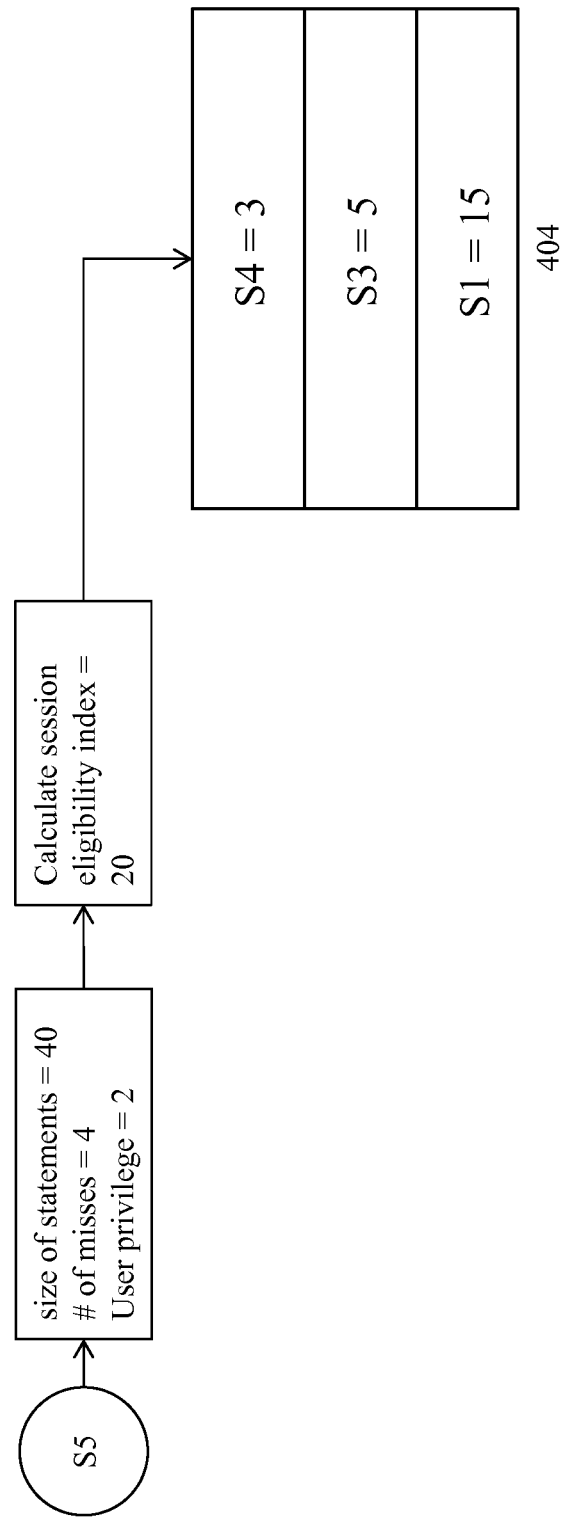

On the other hand, as illustrated in FIG. 4J, session S5 has a low ranking user privilege value of 2. Therefore, even though session S5 has a lower cache size to misses ratio than sessions S1 and S4 indicating that it is performing more poorly, session S5 is not placed on the allocation list 404.

Figure 4K:
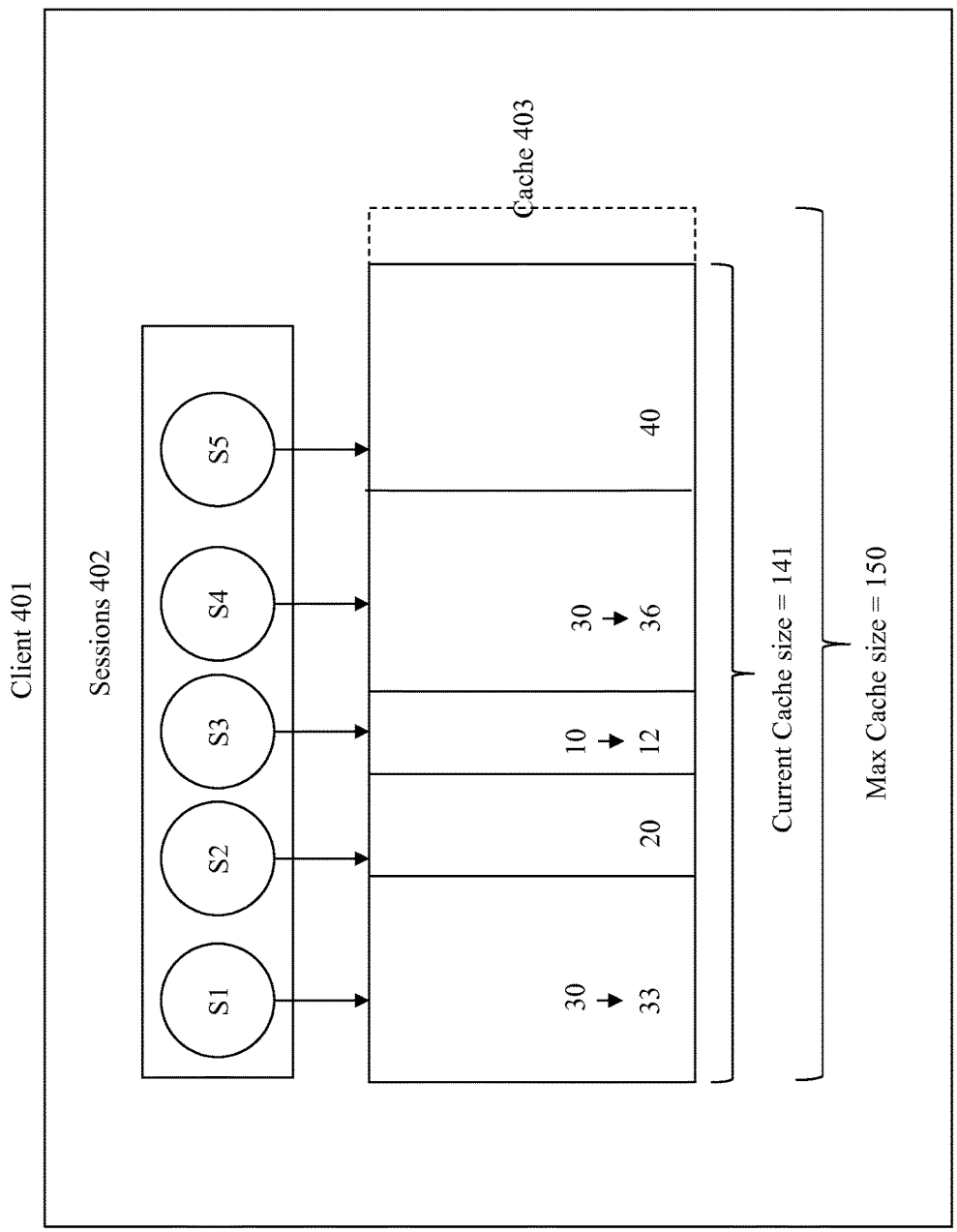

FIG. 4K illustrates the result of the memory resize. As shown by the final allocation list 404 in FIG. 4I, the cache manager will resize sessions S1, S3, and S4. Using the same formula as in FIG. 4G, sessions S1, S3, and S4 will be increased by 3, 6, and 11 memory units respectively. If an upper limit of 20% increase per resize cycle is applied as in the previous example, this would be reduced to 3, 2, and 6 memory units respectively. At the end of the resize cycle, the session caches use a total of 141 units of memory. Because this is under the total memory limit of 150 units of memory, the system does not go into memory pressure mode, and size of the caches may be further increased in the subsequent resize cycle.

FIG. 5 illustrates an example embodiment of a system where the cache manager uses a global sort instead of a request/response system. and the system is in memory pressure mode, so that session cache sizes need to be decreased.

Figure 5A:
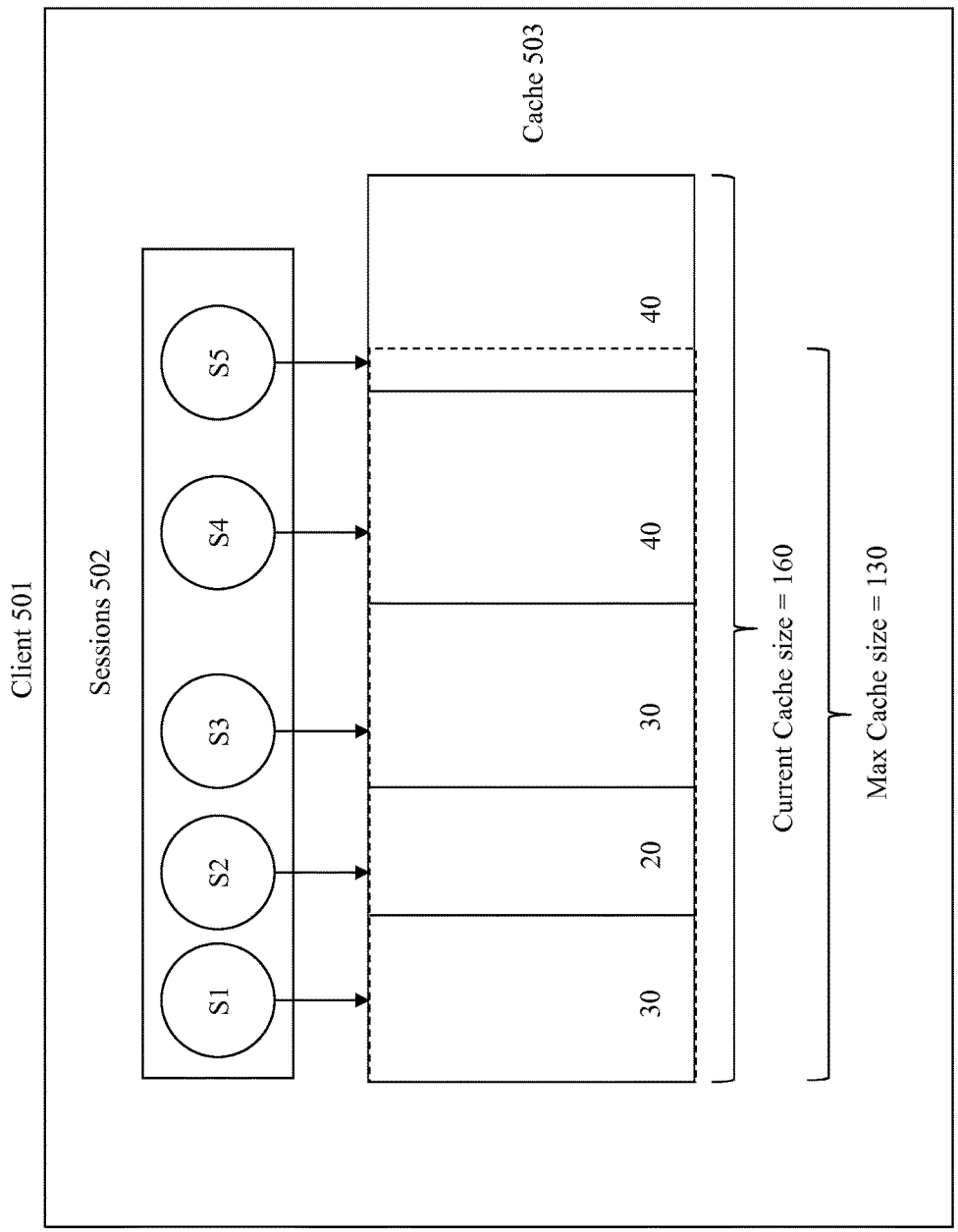
FIGS. 5A-E illustrate an example of a resize cycle without a request/response system.

FIG. 5A illustrates an example of a system at the start of the process. Client 501 comprises a plurality of sessions 502. Each session, S1 through S5, has a session cache within cache 503. As shown in the figure, the session caches currently use a total of 160 units of memory, while the total cache size limit is 130 units of memory. Because the total memory used by the session caches exceeds the total cache size limit, the system is in memory pressure mode.

Figure 5B:
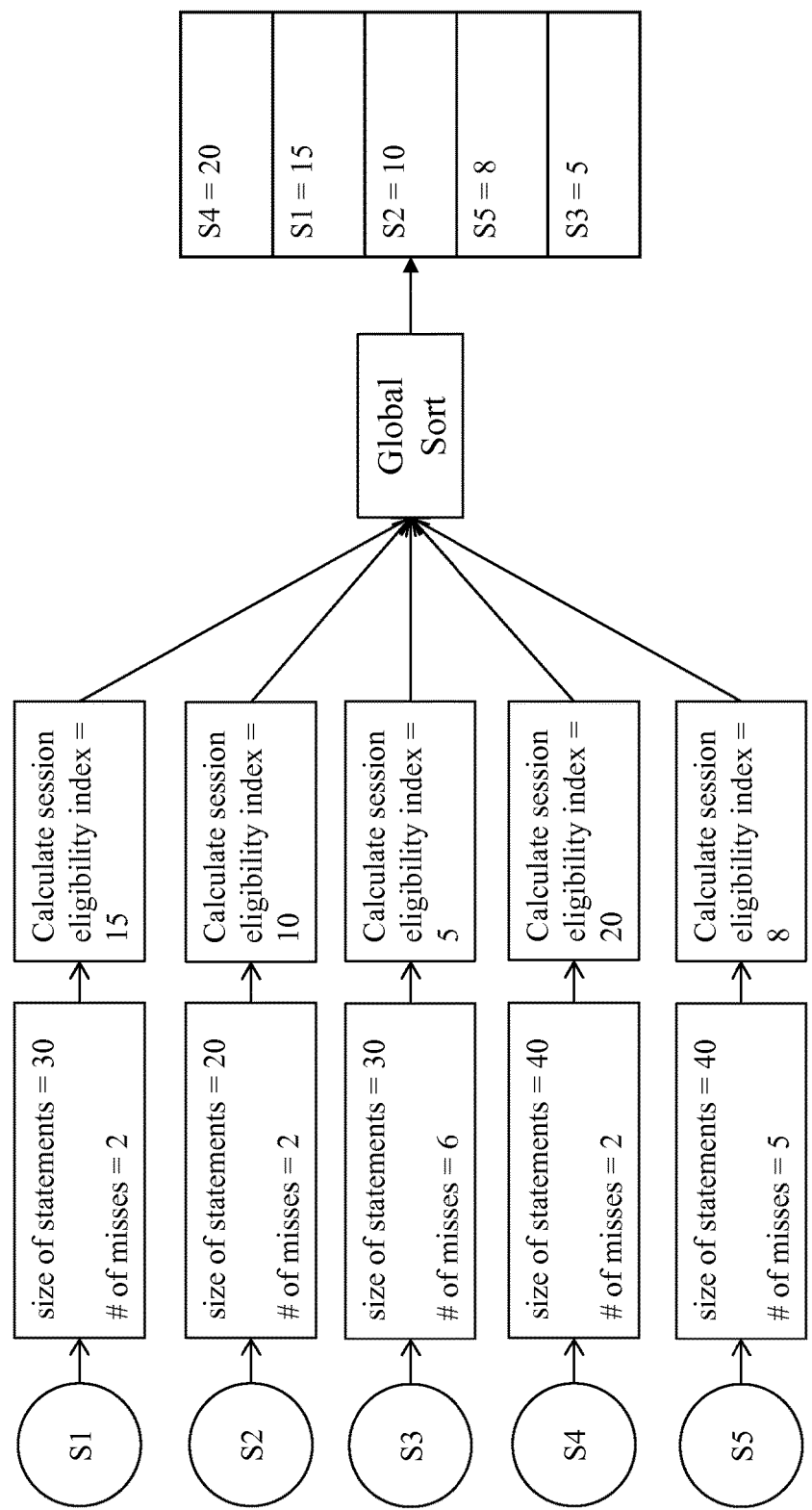

FIG. 5B illustrates the cache manager performing a global sort to determine which session caches to decrease. A session eligibility index is calculated for each session, and the calculated indices are used to sort all sessions. In the illustrated example, the cache manager will decrease memory for all sessions in proportion to their session eligibility indices. In other embodiments, the cache manager may only decrease memory for a set number or percentage of sessions that have the highest session eligibility indices.

Figure 5C:
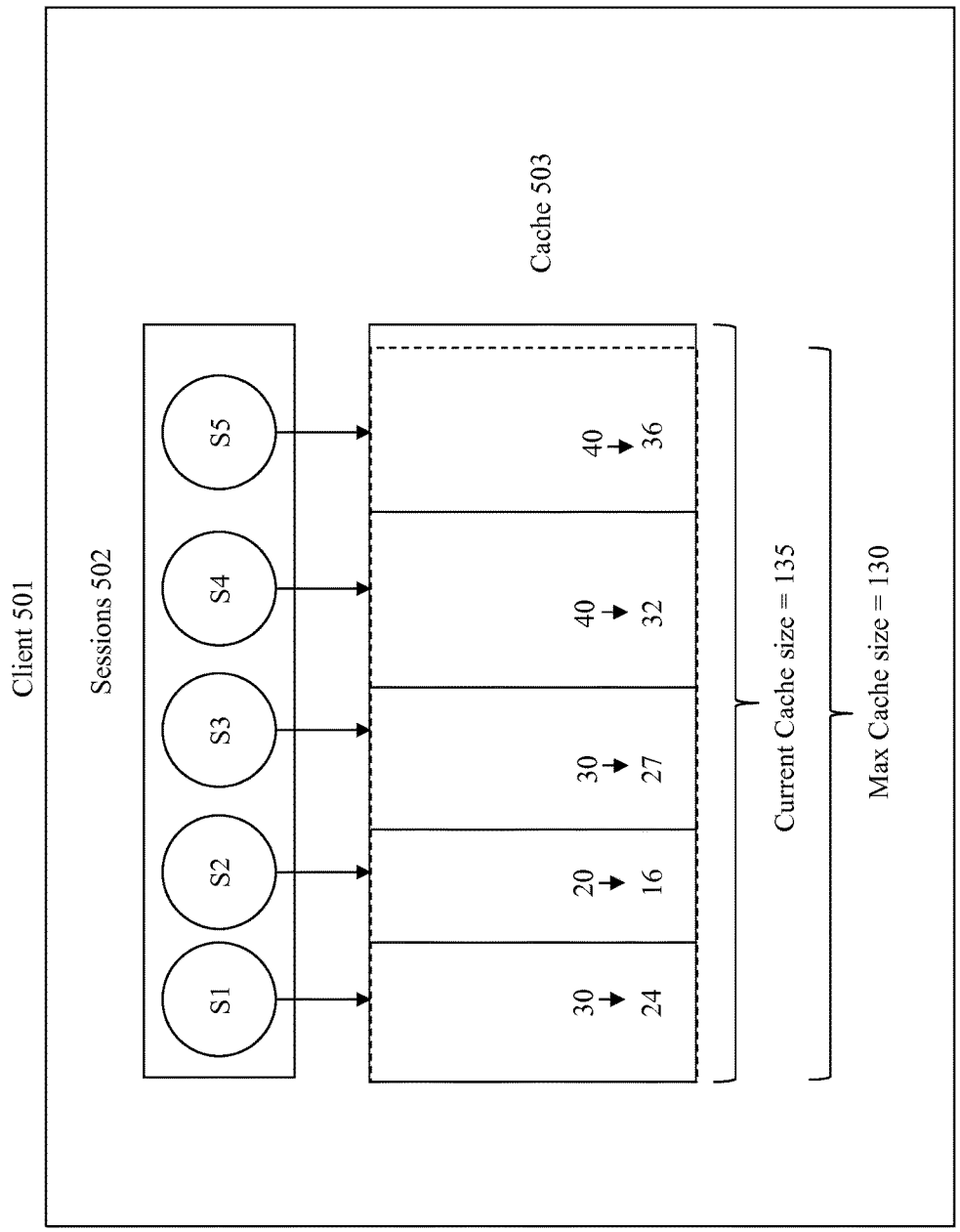

FIG. 5C illustrates the result of the memory resize. Because the session caches currently use 160 units of memory, while the total cache size limit is 130 units of memory, the cache manager will attempt to decrease 30 units of memory from the session caches. Using formula (3) for decreasing session cache sizes described earlier, the cache manager will decrease the caches of sessions S1-5 by 8, 5, 3, 10, and 4 memory units respectively. However, if there is a requirement that a session may only be decreased up to a certain percentage, for example 20%, per resize cycle, then S1, with a size of 30 memory units, would only be requested to free 6 units of memory instead of 8. Similarly, S2 would free 4 units instead of 5, and S4 would free 8 units instead of 10. Thus, at the end of the resize cycle, the total size of the session caches will be 135 memory units. Because this is still greater than the total cache size limit of 130 memory units, the system remains in memory pressure mode, and will attempt to decrease cache memory in subsequent resize cycles.

Figure 5D:
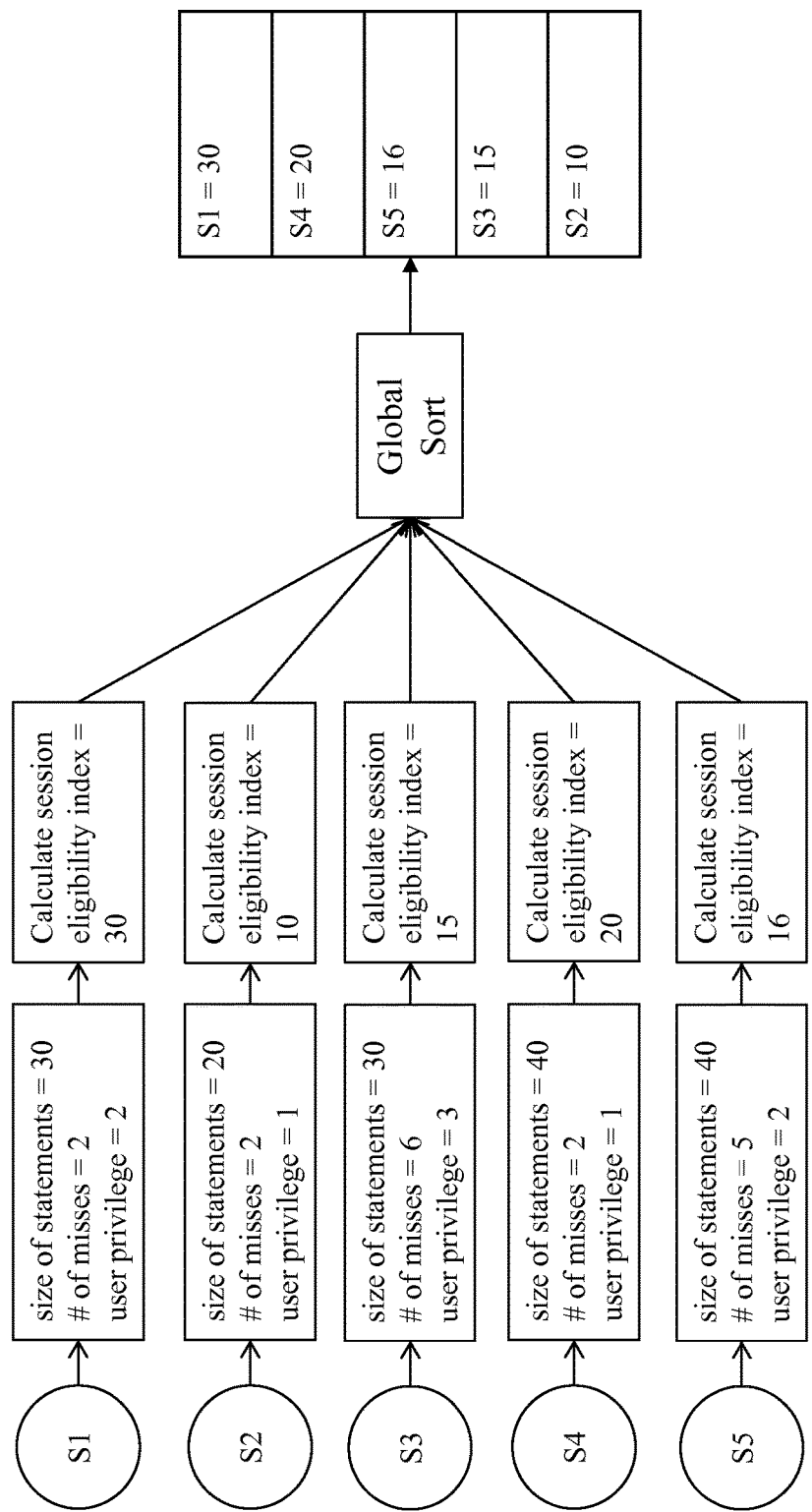
Figure 5E:
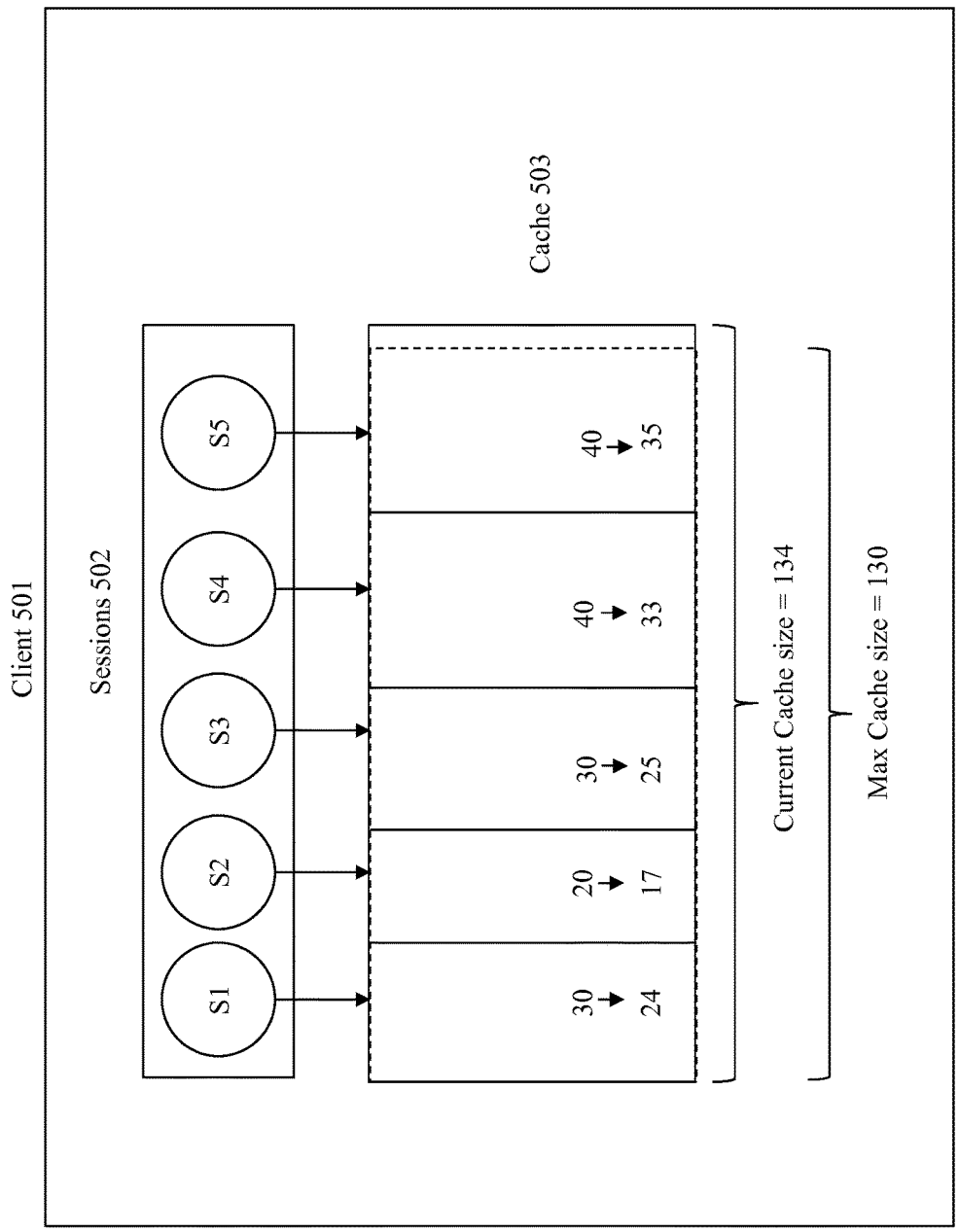

FIGS. 5D-E illustrate an alternate example wherein user privilege is an additional factor used to calculated session eligibility indices. In this example, the session eligibility index is calculated by multiplying a user privilege level with the ratio of cache size to cache misses. A higher ranking user privilege will have a lower value.

FIG. 5D illustrates the cache manager performing a global sort to determine which session caches to decrease. A session eligibility index is calculated for each session, and the calculated indices are used to sort all sessions. In the illustrated example, sessions with a higher ranking user privilege (S2, S4) are selected to relinquish less memory than they would have if only cache size to misses ratio was considered, while sessions with a lower ranking user privilege (S1, S3, and S5) will relinquish more memory.

FIG. 5E illustrates the result of the memory resize. Because the session caches currently use 160 units of memory, while the total cache size limit is 130 units of memory, the cache manager will attempt to decrease 30 units of memory from the session caches. Using the same formula for decreasing session cache sizes as described earlier, the cache manager will decrease the caches of sessions S1-5 by 10, 3, 5, 7, and 5 memory units respectively, which becomes 6, 3, 5, 7, and 5 memory units respectively if an upper limit of 20% per resize cycle is applied. Thus, at the end of the resize cycle, the total size of the session caches will be 134 memory units. Because this is still greater than the total cache size limit of 130 memory units, the system remains in memory pressure mode, and will attempt to decrease cache memory in subsequent resize cycles.

Additional resize cycles will result in fairer distribution of memory as memory is moved from session caches with high session eligibility indices and added to session caches with low session eligibility indices.

System Architecture Overview

Figure 6:
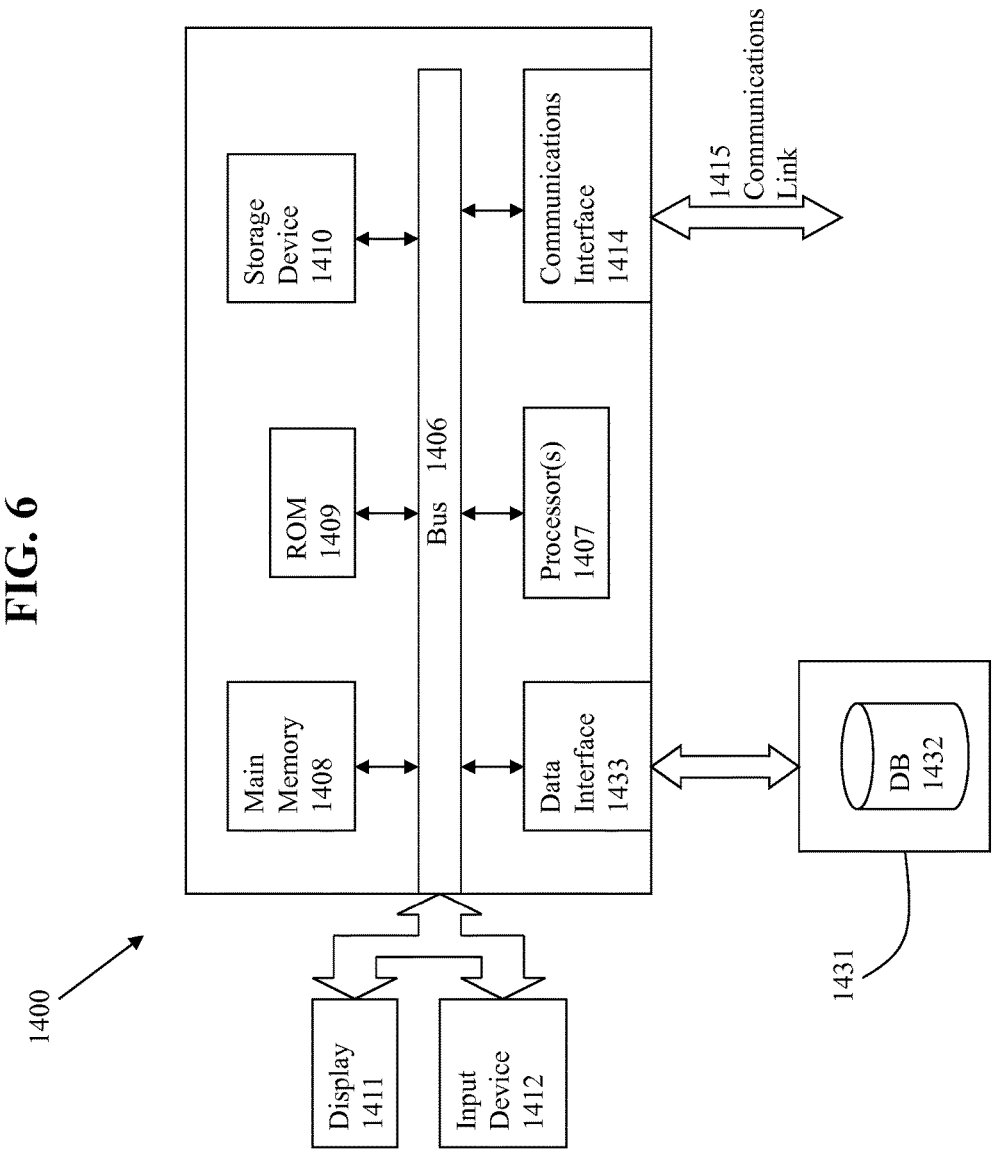
FIG. 6 illustrates a computerized system on which an embodiment of the invention can be implemented.

FIG. 6 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer-implemented method for auto-tuning session cache sizes, comprising:

calculating a respective session eligibility index for each of a plurality of session caches, wherein each session cache of the plurality of session caches corresponds to an respective individual user session having an respective individual session cache within a same cache, the respective session eligibility index is calculated based as least in part on a ratio between a memory size of a corresponding session cache and a value indicating a performance of the corresponding session cache in executing a set of one or more database queries, and the session eligibility index indicates a priority for resizing a corresponding session cache of the plurality of session caches;

inserting, into one or more session data structures, session eligibility indices corresponding to a list of session caches to be resized;

selecting a first session cache and a second session cache from the plurality of session caches within the same cache to be resized, wherein selection of the first session cache and the second session cache comprises comparing respective session eligibility indices of the plurality of session caches; and resizing the first session cache within the same cache by a first amount and the second session cache within the same cache by a second amount, the first amount and the second amount based at least in part on the respective session eligibility indices of the plurality of session caches, wherein resizing the selected session caches corresponds to increasing or decreasing an amount of memory allocated to the first session cache and the second session cache.

2. The method of claim 1, wherein the value indicating the performance of the corresponding session cache is based at least in part on a number of misses experienced by the corresponding session cache.

3. The method of claim 1, wherein the corresponding session cache corresponds to a session, and the session eligibility index for the corresponding session cache is based at least in part upon privileges for the session.

4. The method of claim 3, wherein session privileges are based at least in part upon a session user ranking, wherein the session eligibility index is modified by multiplying a number representing the session user ranking.

5. The method of claim 1, wherein a corresponding session cache is resized by an amount based at least in part on the session eligibility index of the corresponding session cache.

6. The method of claim 1, wherein a corresponding session cache is resized by an amount based at least in part upon an overall memory available to be distributed in a given resize cycle.

7. The method of claim 1, wherein a corresponding session cache is resized by an amount based at least in part upon a size of the corresponding session cache.

8. The method of claim 1, wherein the selecting is performed periodically or on an as needed basis.

9. The method of claim 1, wherein a number of session caches on the list of session caches to be resized may be less than a total number of session caches.

10. The method of claim 9, wherein a session cache calculates a session eligibility index periodically to determine whether the session cache will be included on the list of session caches to be resized.

11. The method of claim 10, wherein determining whether the first session cache will be included on the list of session caches to be resized comprises comparing the session eligibility index of the first session cache to the session eligibility index of the second session cache.

12. The method of claim 1, wherein the resizing comprises decreasing a memory for the selected session caches when a total memory of the same cache used by the plurality of session caches exceeds a predetermined limit.

13. The method of claim 1, wherein the resizing of the selected session caches is performed periodically or on an as needed basis by a cache manager.

14. A system for auto-tuning session cache sizes, comprising:
a processor; and
a memory to hold program code instructions, in which the program code instructions comprises program code to perform:
calculating a respective session eligibility index for each of a plurality of session caches, wherein each session cache of the plurality of session caches corresponds to an respective individual user session having an respective individual session cache within a same cache, the respective session eligibility index is calculated based as least in part on a ratio between a memory size of a corresponding session cache and a value indicating a performance of the corresponding session cache in executing a set of one or more database queries, and the session eligibility index indicates a priority for resizing a corresponding session cache of the plurality of session caches;
inserting, into one or more session data structures, session eligibility indices corresponding to a list of session caches to be resized;
selecting a first session cache and a second session cache from the plurality of session caches within the same cache to be resized, wherein selection of the first session cache and the second session cache comprises comparing respective session eligibility indices of the plurality of session caches;
resizing the first session cache within the same cache by a first amount and the second session cache within the same cache by a second amount, the first amount and the second amount based at least in part on the respective session eligibility indices of the plurality of session caches, wherein resizing the selected session caches corresponds to increasing or decreasing an amount of memory allocated to the first session cache and the second session cache.

15. The system of claim 14, wherein the value indicating the performance of the corresponding session cache is based at least in part on a number of misses experienced by the corresponding session cache.

16. The system of claim 14, wherein the corresponding session cache corresponds to a session, and the session eligibility index for the corresponding session cache is based at least in part upon privileges for the session.

17. The system of claim 14, wherein the corresponding session cache is resized by an amount based at least in part on at least one of: the session eligibility index of the corresponding session cache, an overall memory available to be distributed in a given resize cycle, and a size of the corresponding session cache.

18. The system of claim 14, wherein the selecting is performed periodically or on an as needed basis.

19. The system of claim 14, wherein a number of session caches on the list of session caches to be resized may be less than a total number of session caches.

20. The system of claim 19, further comprising program code for a session cache that calculates a session eligibility index periodically to determine whether the session cache will be included on the list of session caches to be resized.

21. The system of claim 20, wherein determining whether the first session cache will be included on the list of session caches to be resized comprises comparing the session eligibility index of the first session cache to the session eligibility index of the second session cache.

22. The system of claim 14, wherein the resizing comprises decreasing a memory for the selected session caches when a total memory of the same cache used by the plurality of session caches exceeds a predetermined limit.

23. The system of claim 14, wherein the resizing of the selected session caches is performed periodically or on an as needed basis by a cache manager.

24. A computer program product including a non-transitory computer readable medium having instructions which, when executed by a processor, causes the processor to perform a process for auto-tuning session cache sizes, the process comprising:

calculating a respective session eligibility index for each of a plurality of session caches, wherein each session cache of the plurality of session caches corresponds to an respective individual user session having an respective individual session cache within a same cache, the respective session eligibility index is calculated based as least in part on a ratio between a memory size of a corresponding session cache and a value indicating a performance of the corresponding session cache in executing a set of one or more database queries, and the session eligibility index indicates a priority for resizing a corresponding session cache of the plurality of session caches;

inserting, into one or more session data structures, session eligibility indices corresponding to a list of session caches to be resized;

selecting a first session cache and a second session cache from the plurality of session caches within the same cache to be resized, wherein selection of the first session cache and the second session cache comprises comparing respective session eligibility indices of the plurality of session caches;

resizing the first session cache within the same cache by a first amount and the second session cache within the same cache by a second amount, the first amount and the second amount based at least in part on the respective session eligibility indices of the plurality of session caches, wherein resizing the selected session caches corresponds to increasing or decreasing an amount of memory allocated to the first session cache and the second session cache.

25. The computer program product of claim 24, wherein the value indicating the performance of the corresponding session cache is based at least in part on a number of misses experienced by the corresponding session cache.

26. The computer program product of claim 24, wherein the corresponding session cache corresponds to a session, and the session eligibility index for the corresponding session cache is based at least in part upon privileges for the session.

27. The computer program product of claim 24, wherein the corresponding session cache is resized by an amount based at least in part on at least one of: the session eligibility index of the corresponding session cache, an overall memory available to be distributed in a given resize cycle, a size of the corresponding session cache.

28. The computer program product of claim 24, wherein the selecting is performed periodically or on an as needed basis.

29. The computer program product of claim 24, wherein a number of session caches on the list of session caches to be resized may be less than a total number of session caches.

30. The computer program product of claim 29, the computer program product further comprising instructions for implementing a session cache that calculates a session eligibility index periodically to determine whether the session cache will be included on the list of session caches to be resized.

31. The computer program product of claim 30, wherein determining whether the first session cache will be included on the list of session caches to be resized comprises comparing the session eligibility index of the first session cache to the session eligibility index of the second session cache.

32. The computer program product of claim 24, wherein the resizing comprises decreasing a memory for the selected session caches when a total memory of the same cache used by the plurality of session caches exceeds a predetermined limit.

33. The computer program product of claim 24, wherein the resizing of the selected session caches is performed periodically or on an as needed basis by a cache manager.

* * * * *